A. D. ELLIOTT.
FOLDING MACHINE.
APPLICATION FILED JAN. 22, 1920.

1,420,474.

Patented June 20, 1922.
17 SHEETS—SHEET 3.

Inventor
Alexander D. Elliott
By: Penn Fisher & Clapp
Attys

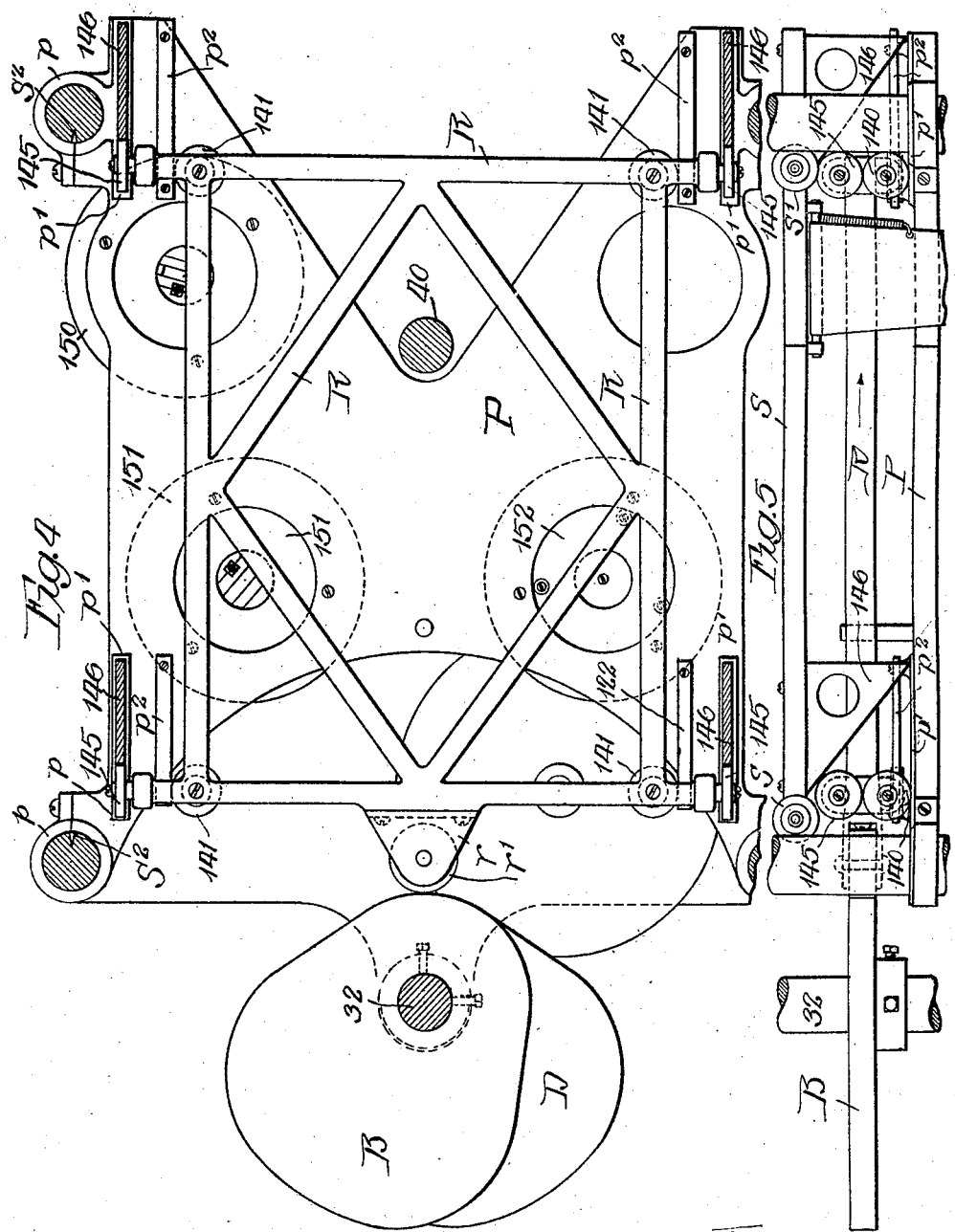

A. D. ELLIOTT.
FOLDING MACHINE.
APPLICATION FILED JAN. 22, 1920.
1,420,474.
Patented June 20, 1922.
17 SHEETS—SHEET 5.
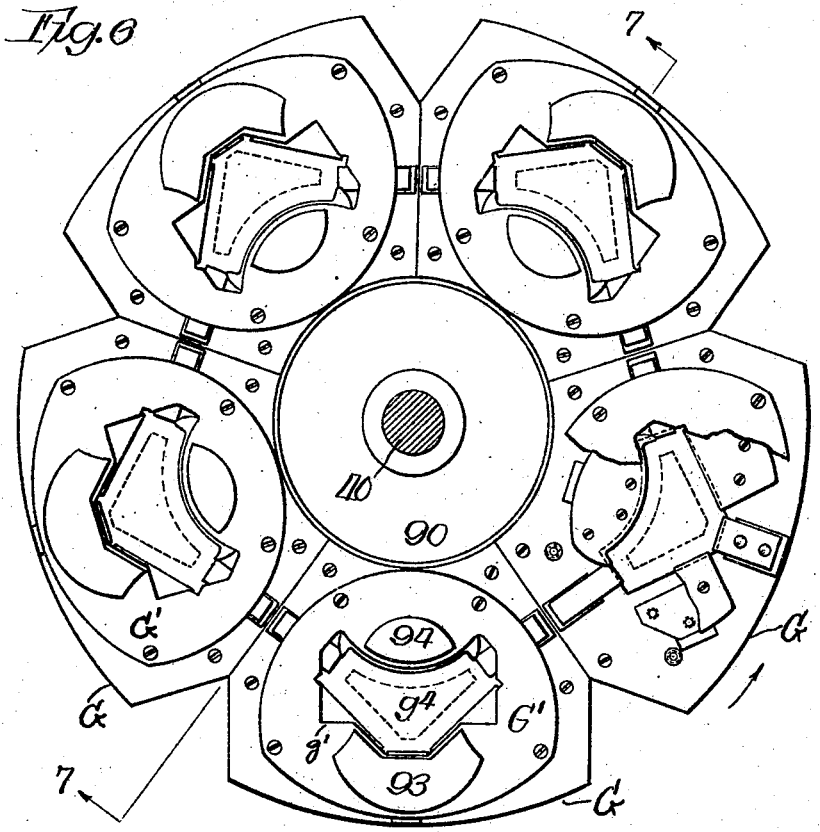
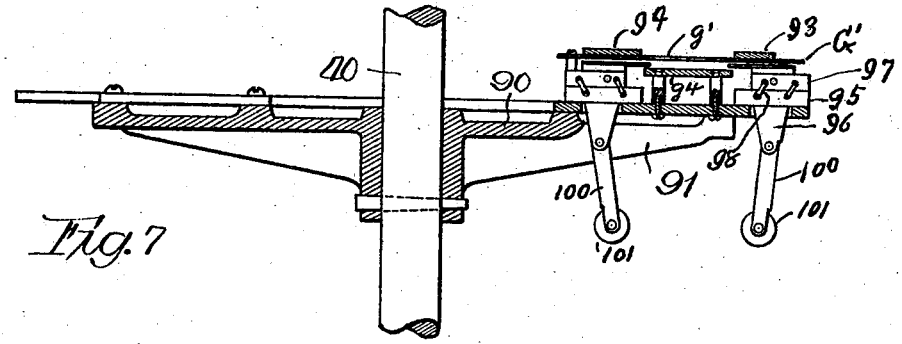
Inventor
Alexander D. Elliott

A. D. ELLIOTT.
FOLDING MACHINE.
APPLICATION FILED JAN. 22, 1920.

1,420,474.

Patented June 20, 1922.
17 SHEETS—SHEET 6.

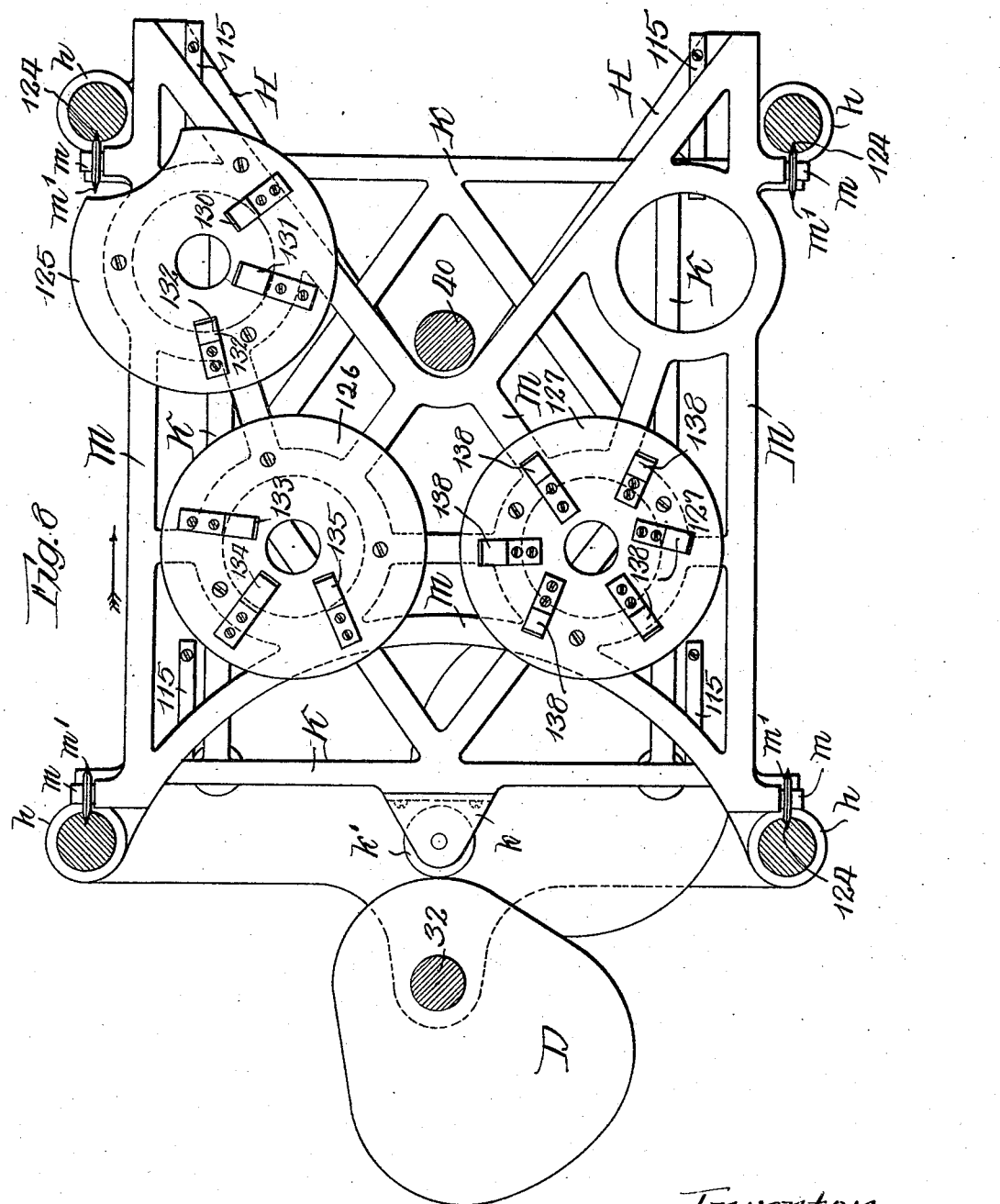

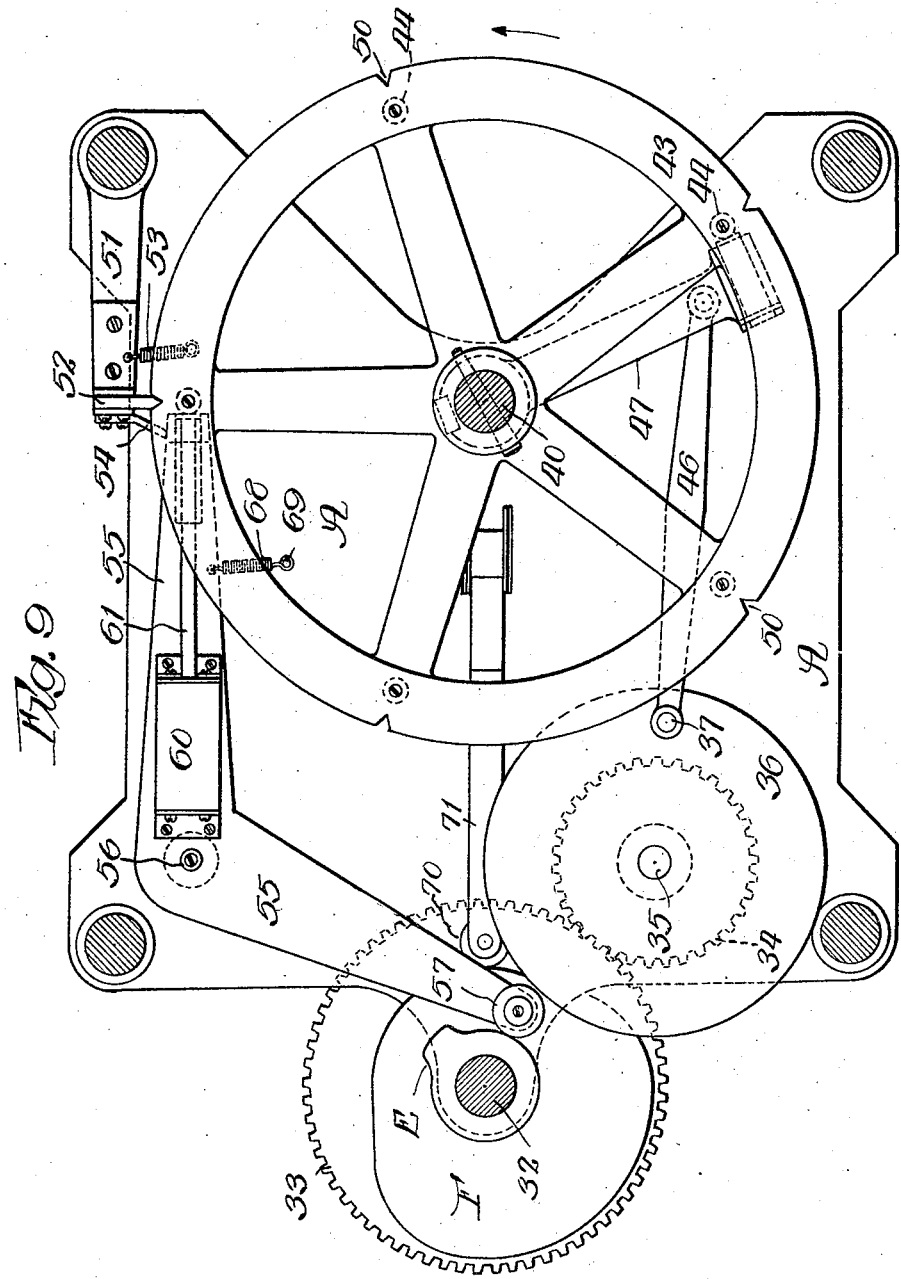

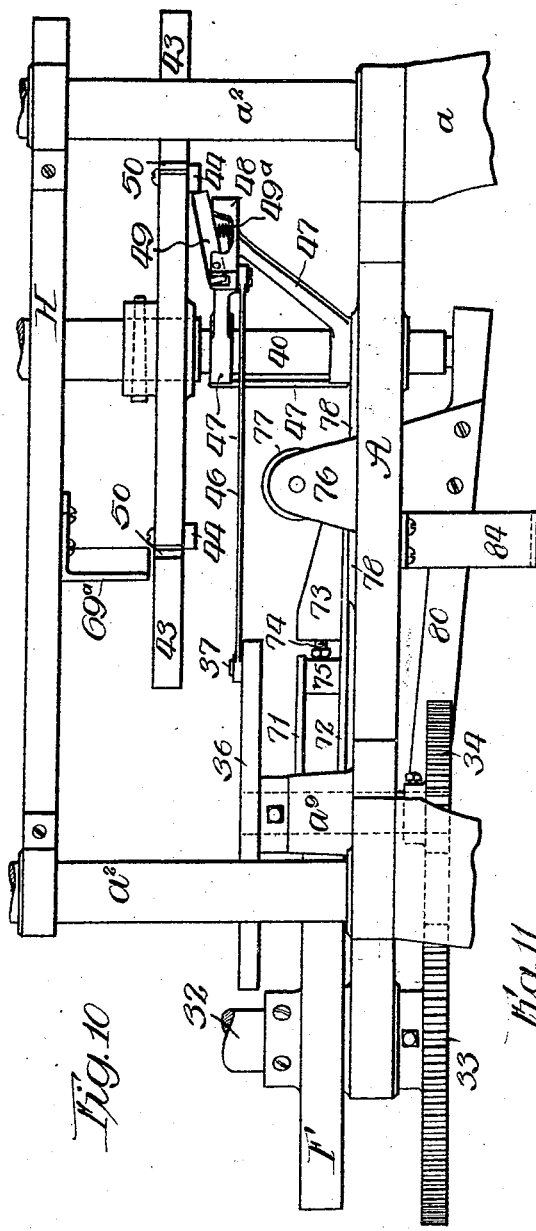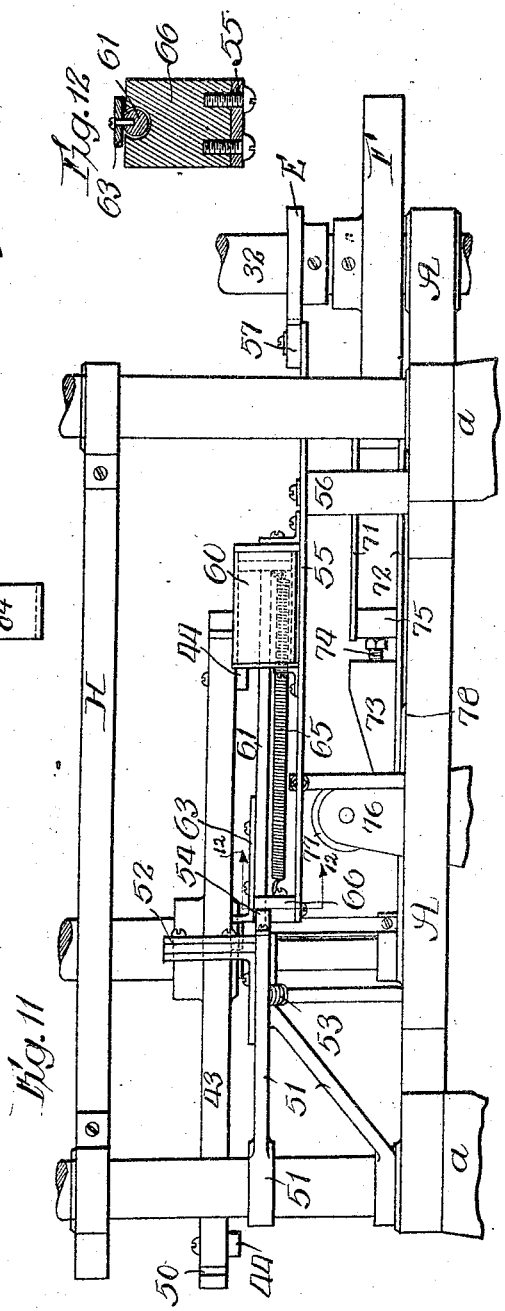

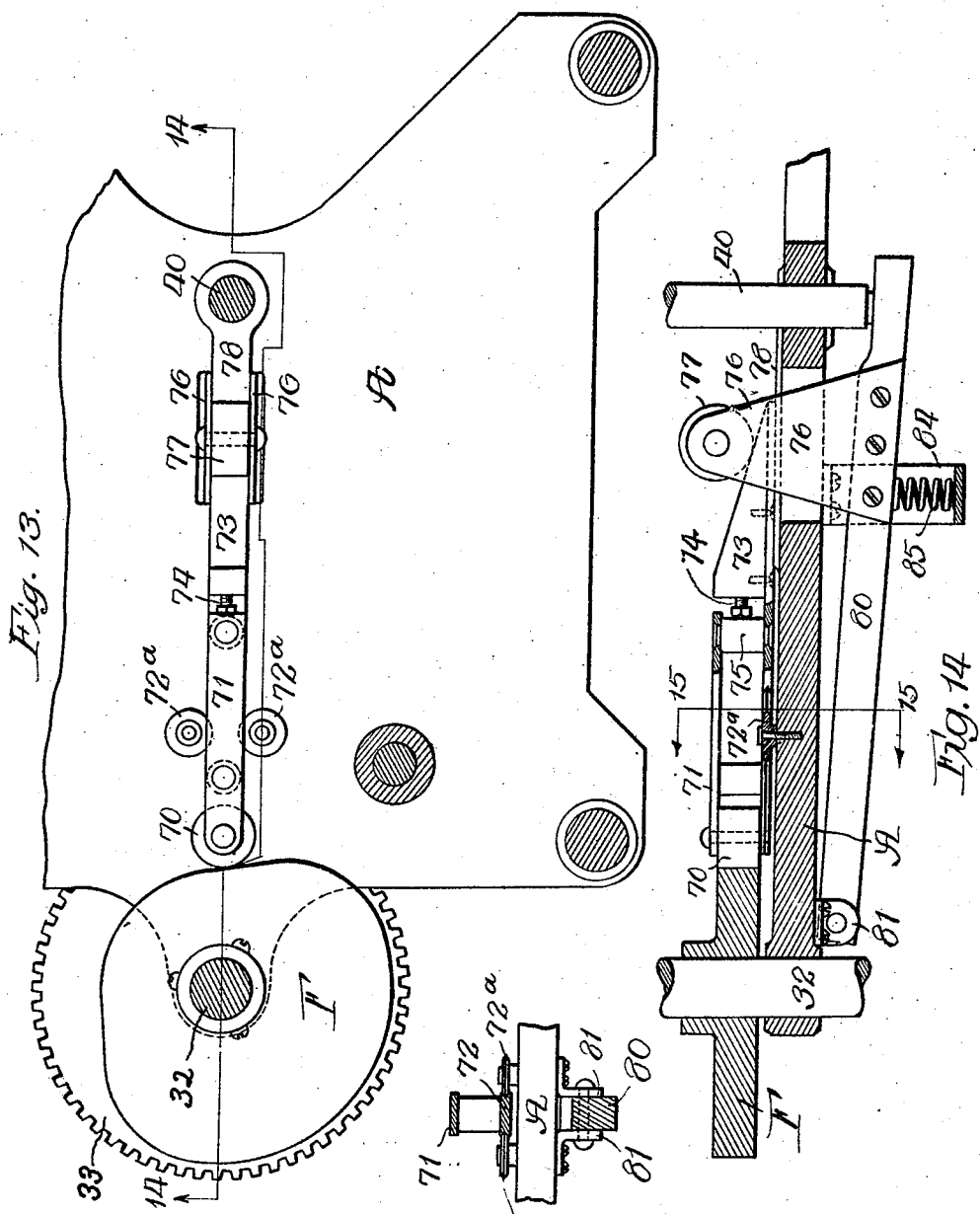

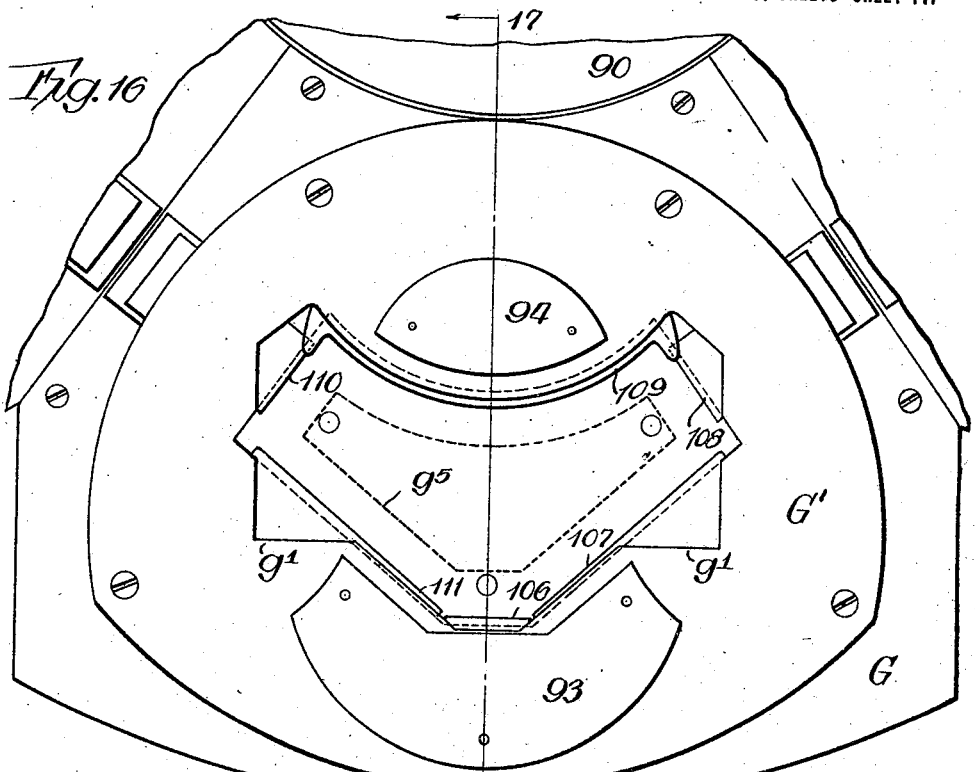
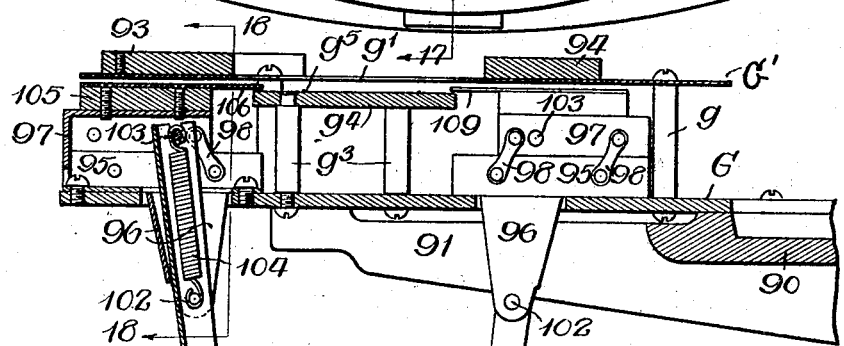
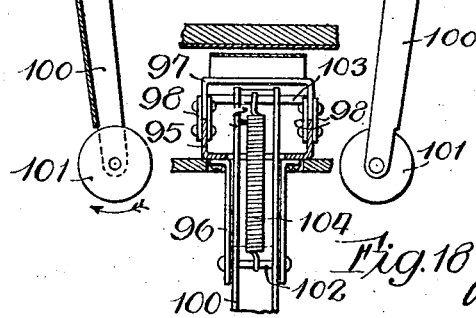

A. D. ELLIOTT.
FOLDING MACHINE.
APPLICATION FILED JAN. 22, 1920.

1,420,474.

Patented June 20, 1922.
17 SHEETS—SHEET 12.

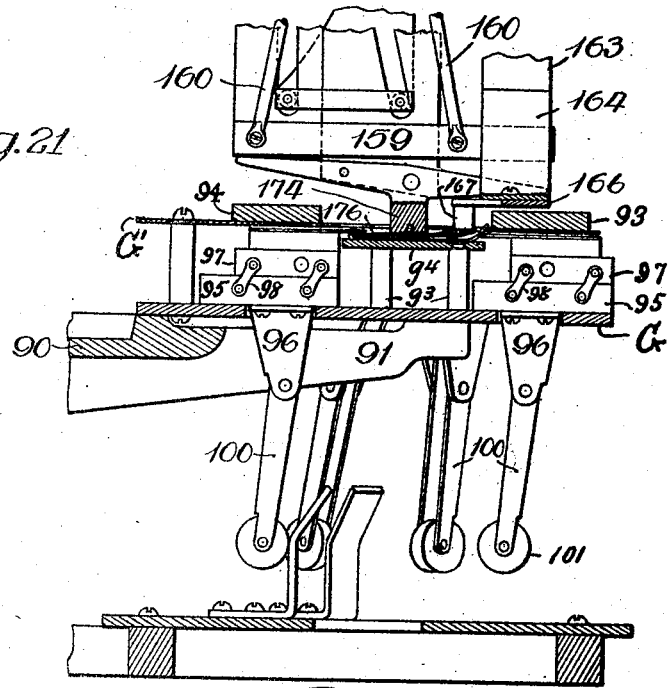
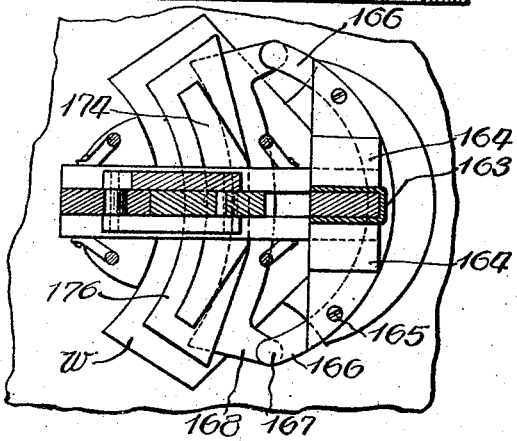

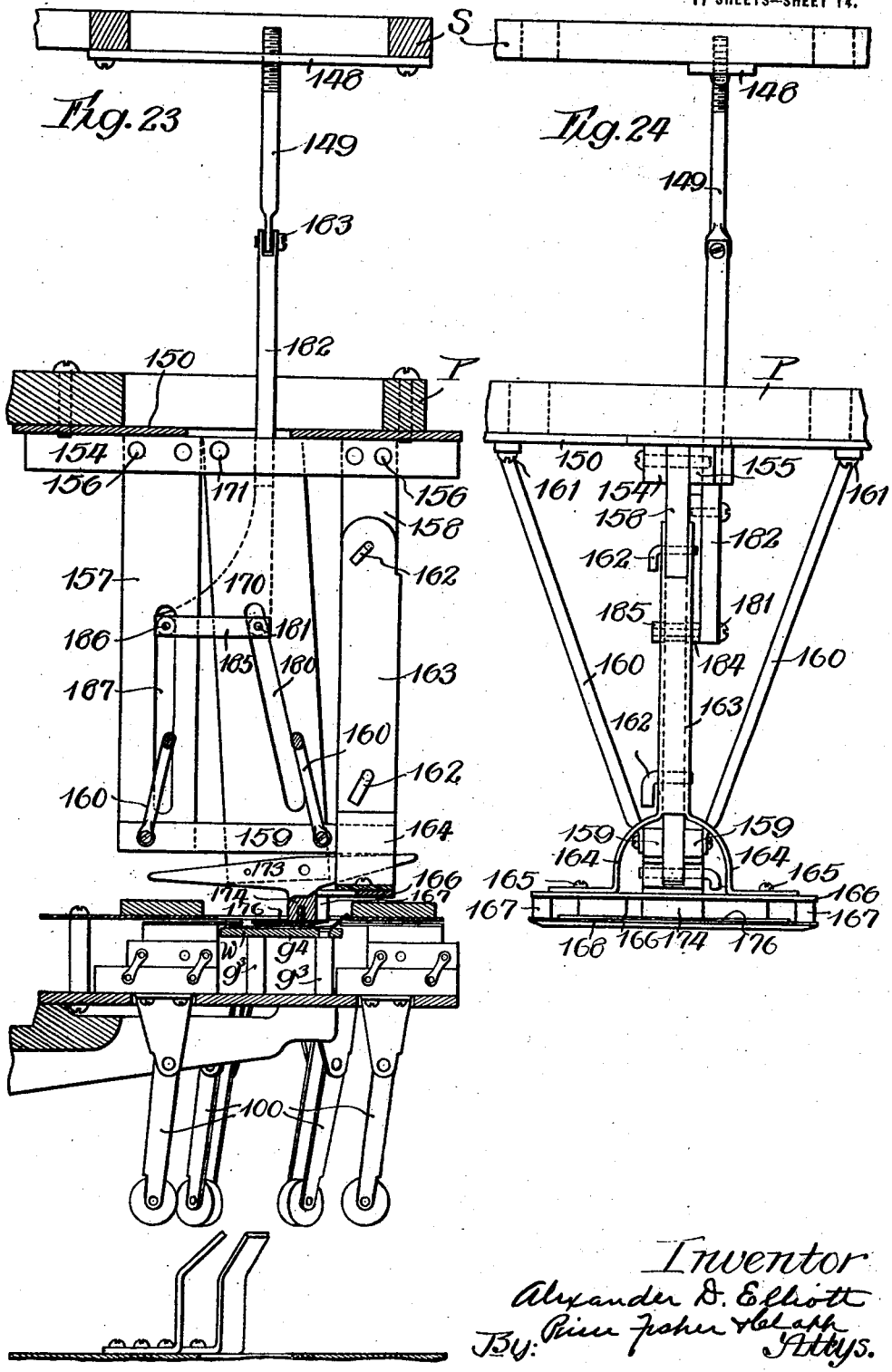

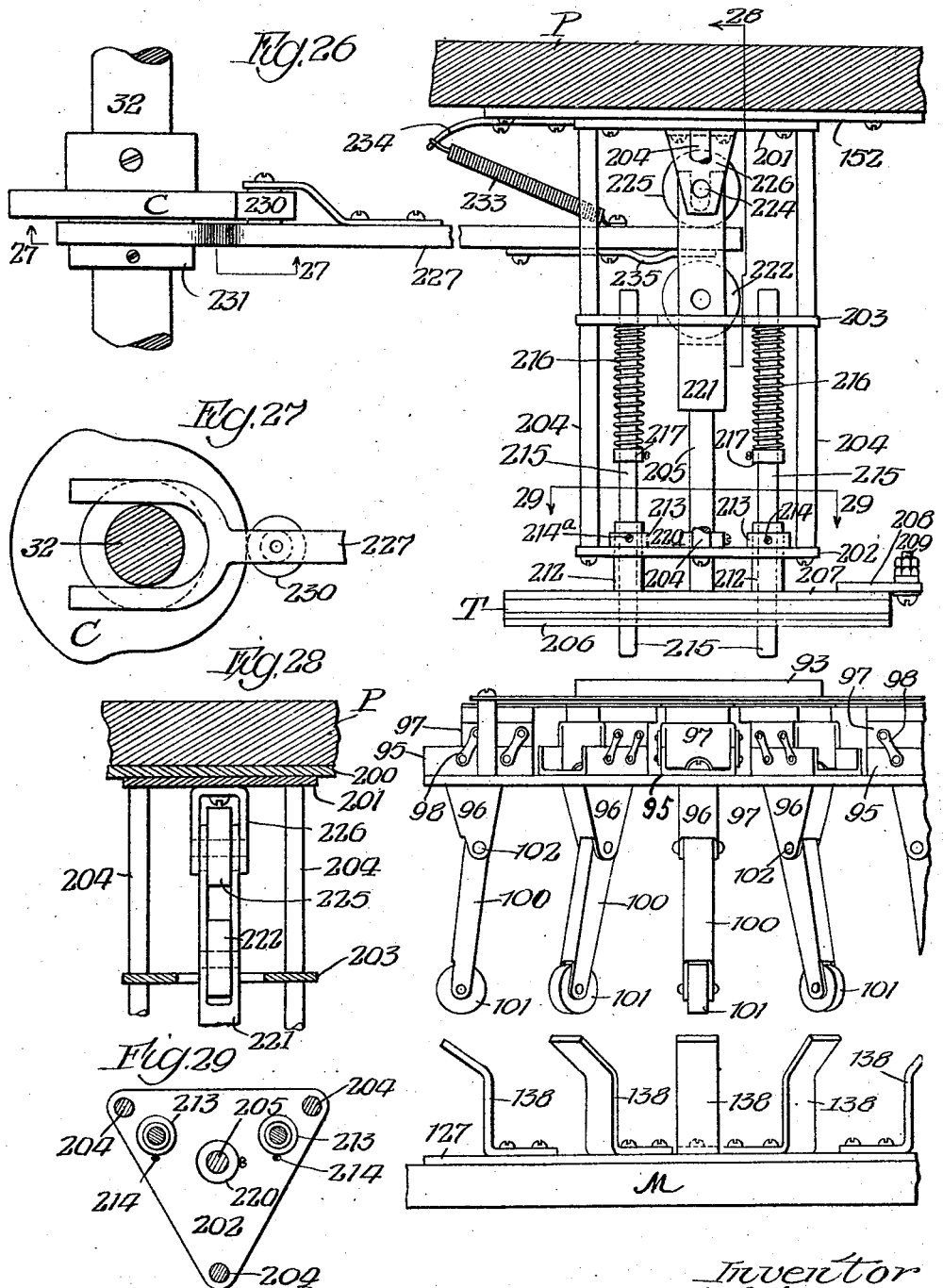

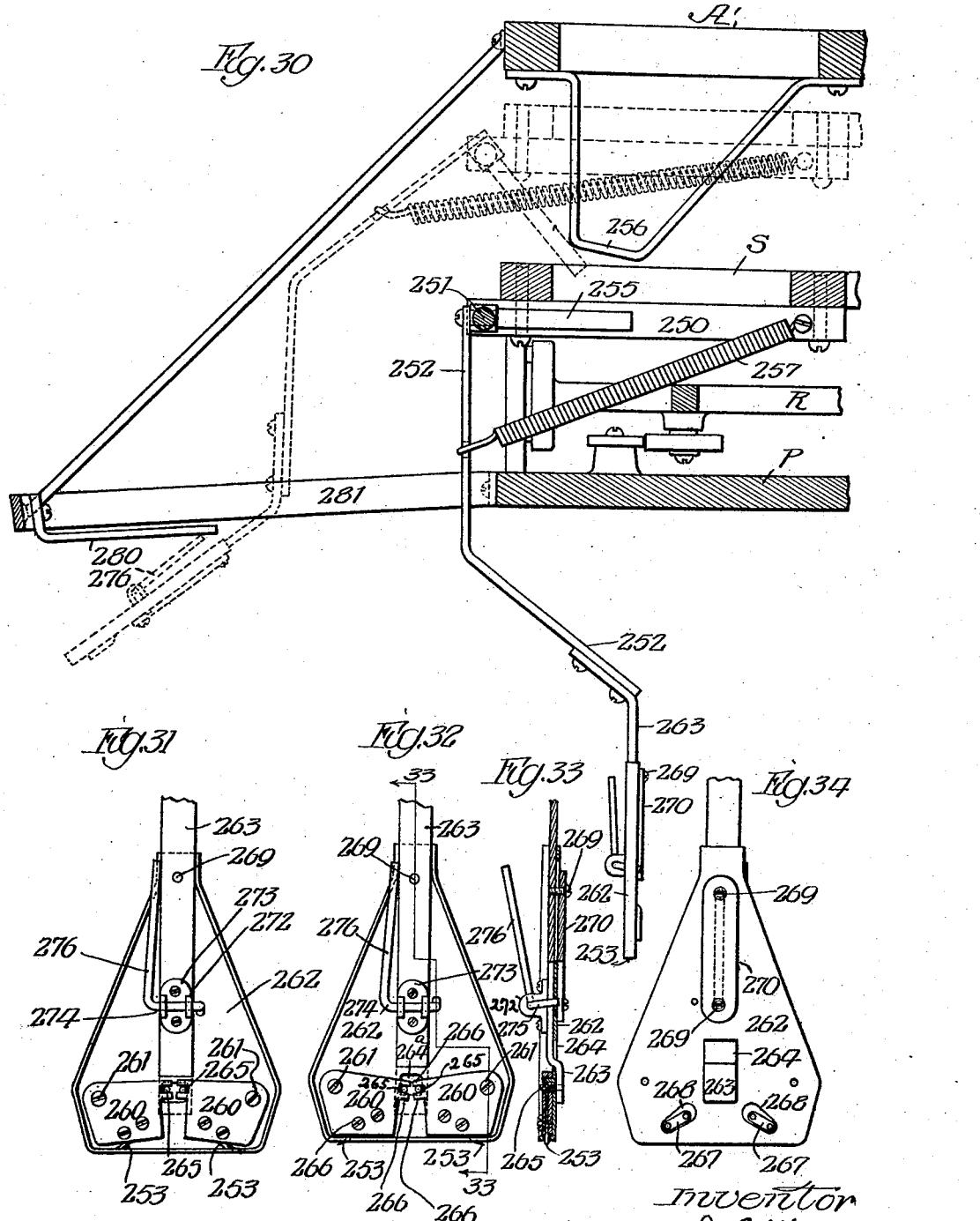

UNITED STATES PATENT OFFICE.

ALEXANDER D. ELLIOTT, OF VIOLA, ILLINOIS, ASSIGNOR TO A. STEIN & COMPANY, OF CHICAGO, ILLINOIS, A CORPORATION.

FOLDING MACHINE.

1,420,474.  Specification of Letters Patent.  Patented June 20, 1922.

Application filed January 22, 1920. Serial No. 353,323.

*To all whom it may concern:*

Be it known that I, ALEXANDER D. ELLIOTT, a citizen of the United States, and a resident of Viola, in the county of Mercer and State of Illinois, have invented certain new and useful Improvements in Folding Machines, of which I do declare the following to be a description, reference being had to the accompanying drawings, forming a part of this specification.

The present invention has relation more particularly to that class of folding machines designed for turning the edges of the fabric blanks from which articles such as garter pads, cuffs, collars, or the like, are to be formed and the invention consists in the features of improvement hereinafter described, illustrated in the accompanying drawings and particularly pointed out in the claims at the end of this specification.

Figure 1:
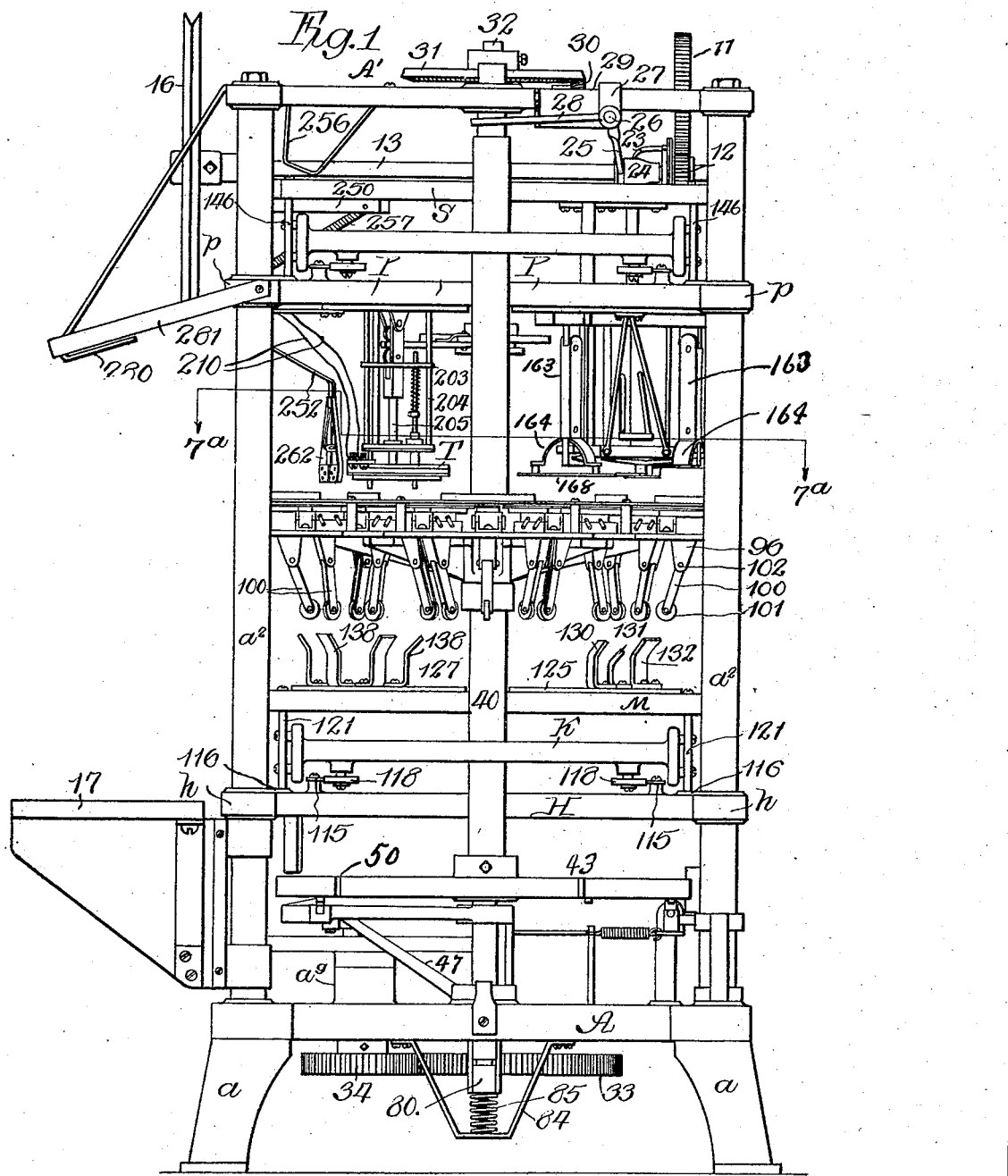
Figure 2:
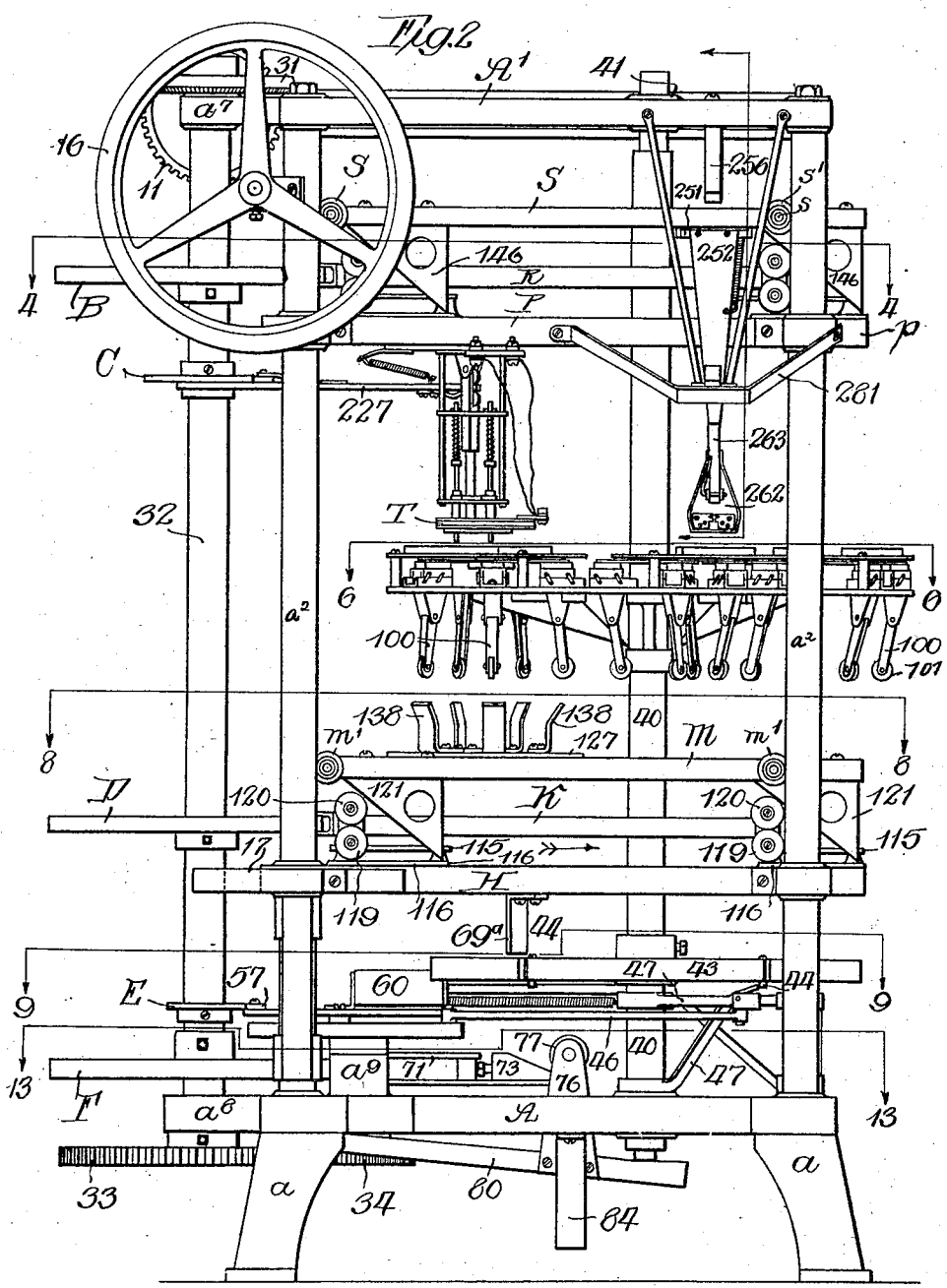
Figure 3:
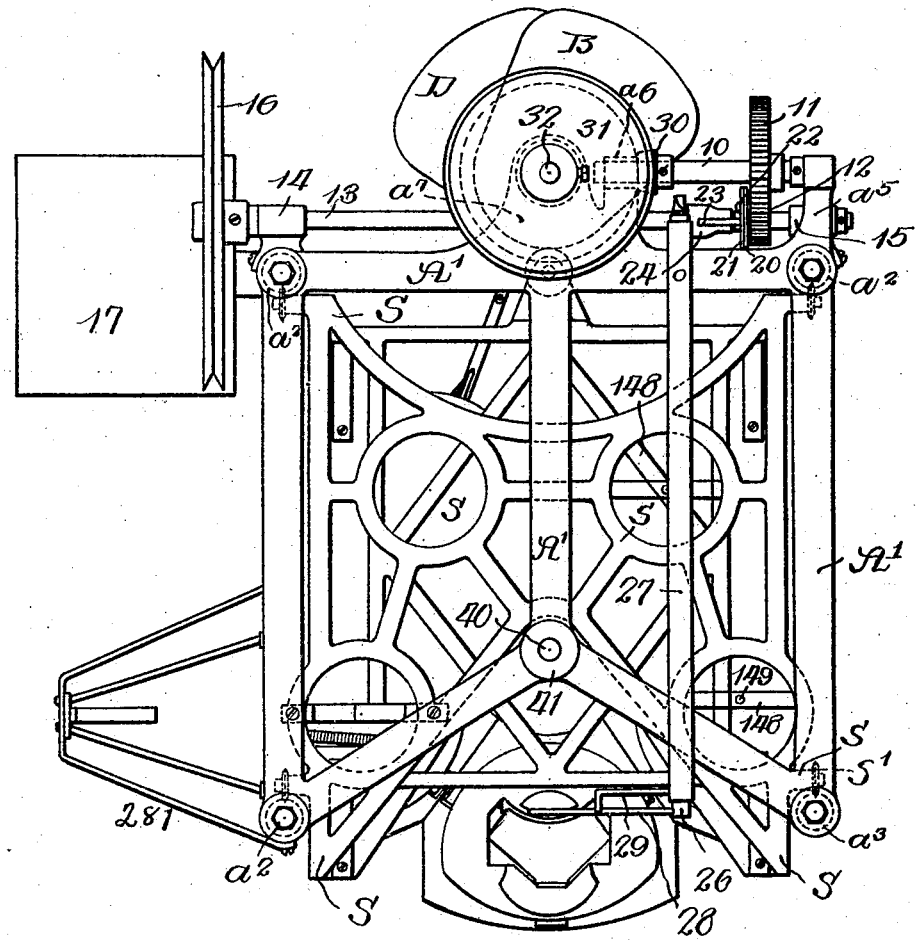
Figure 7A:
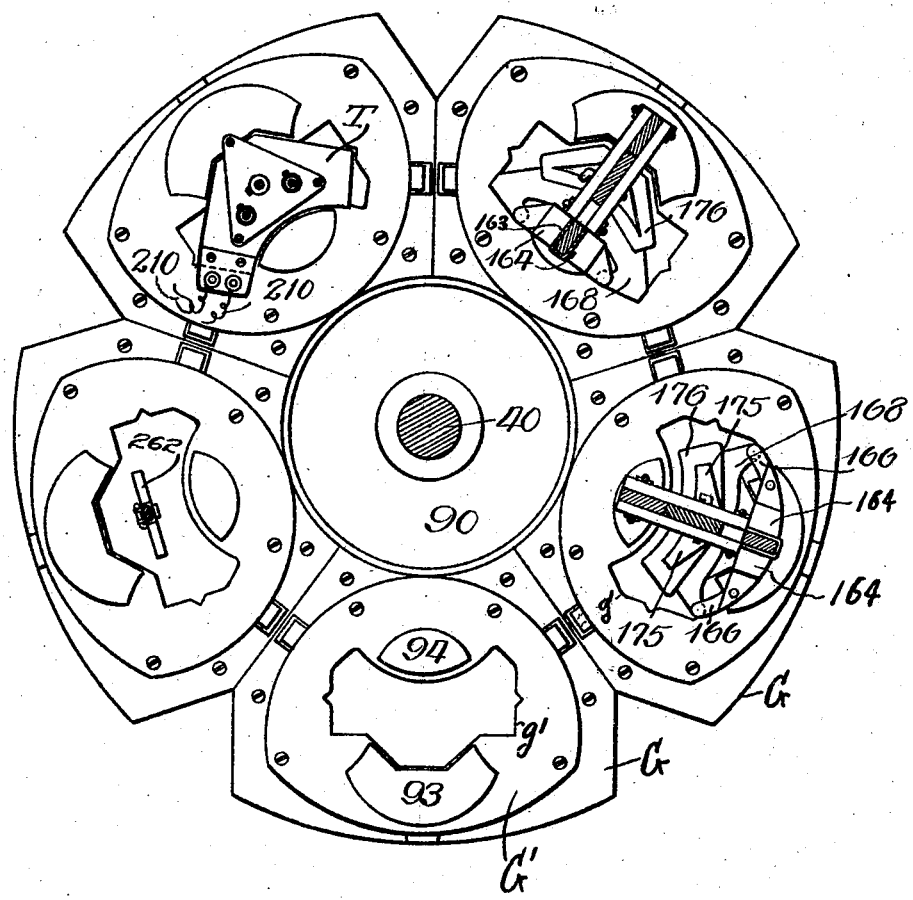
Figure 19:
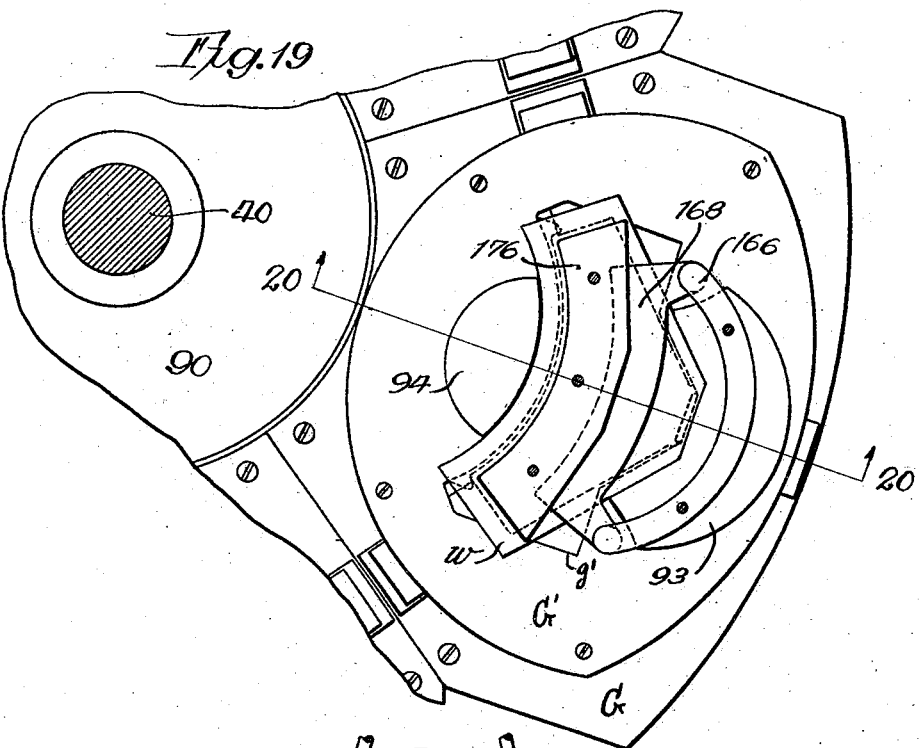
Figure 20:
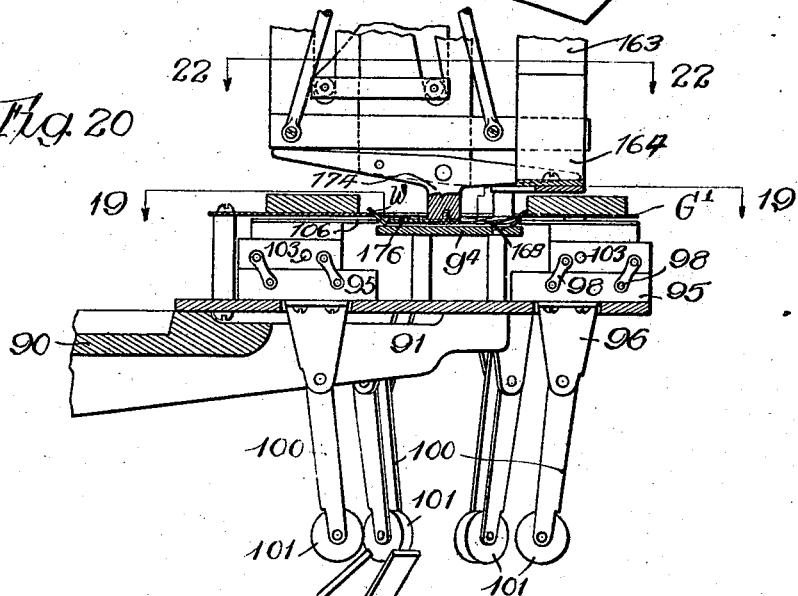
Figure 25:
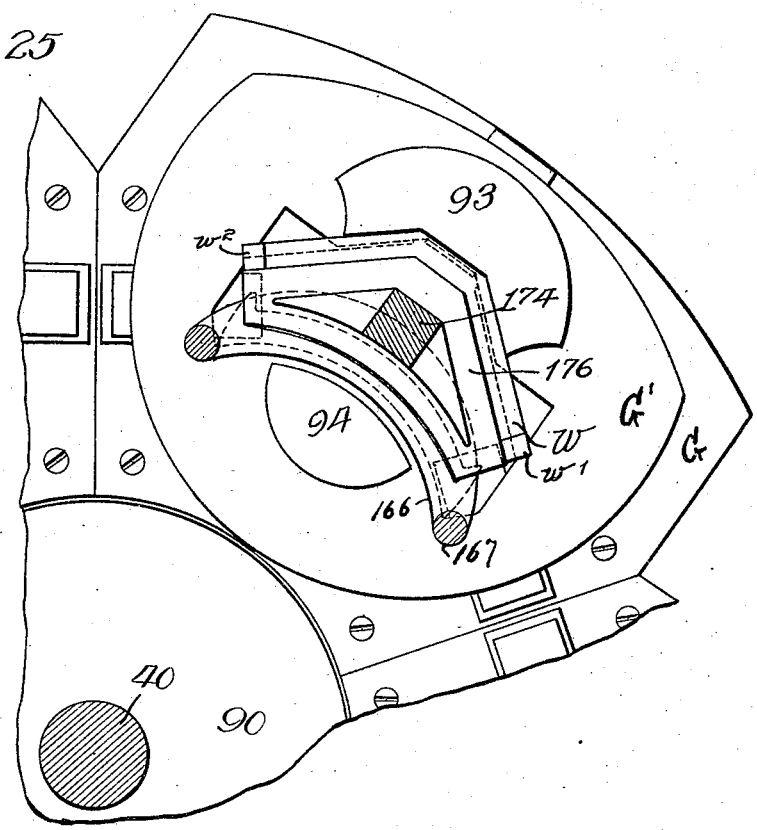
Figures 35, 36:
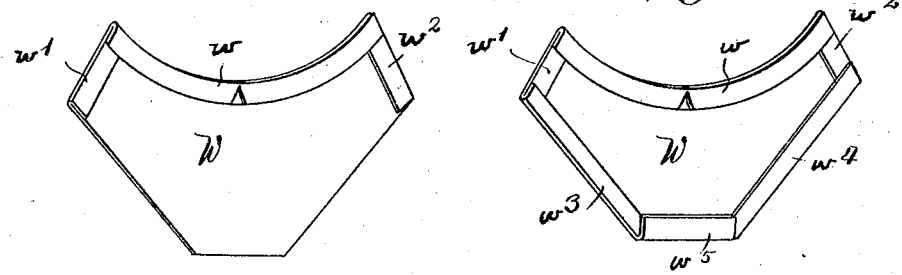

Figure 1 is a view in front elevation of the machine embodying my invention. Figure 2 is a view in side elevation of the machine. Figure 3 is a plan view. Figure 4 is a view in horizontal section on the line 4—4 of Fig. 2. Figure 5 is a view in side elevation of the parts illustrated in Fig. 4. Figure 6 is a view in horizontal section on line 6—6 of Fig. 2. Figure 7 is a view in vertical section on line 7—7 of Fig. 6. Figure 7a is a view in horizontal section on line 7a—7a of Fig. 1. Figure 8 is a view in horizontal section on line 8—8 of Fig. 2. Figure 9 is a view in horizontal section on line 9—9 of Fig. 2. Figure 10 is a view in side elevation of the parts shown in Fig. 9 taken from one side of the machine. Figure 11 is a view in side elevation of the lower part of the machine from the side opposite that shown in Fig. 10. Figure 12 is a view in vertical section on line 12—12 of Fig 11. Figure 13 is a view in horizontal section on line 13—13 of Fig. 2. Figure 14 is a view in vertical section on line 14—14 of Fig. 13. Figure 15 is a view in vertical section on line 15—15 of Fig. 14. Figure 16 is a plan view upon an enlarged scale of one of the supports for the fabric blanks and one of the groups of folder blades and parts associated therewith. Figure 17 is a view in vertical section on line 17—17 of Fig. 16, parts being shown in elevation. Figure 18 is a view in vertical section on line 18—18 of Fig. 17. Figure 19 is a view partly in plan and partly in horizontal section on line 19—19 of Fig. 20. Figure 20 is a view partly in elevation and partly in vertical section on line 20—20 of Fig. 19, this view illustrating the first of the dies or templets that cooperates in folding the blanks. Figure 21 is a view similar to Fig. 20 but showing certain of the parts in different positions. Figure 22 is a view in horizontal section on line 22—22 of Fig. 20. Figure 23 is a view in vertical section through one of the supports for the fabric blanks and parts adjacent thereto and through one of the dies or templets, the folder blades and their operating levers being shown in elevation and the swinging arm for shifting the die or templet and parts associated therewith being also shown in elevation. Figure 24 is a view in front elevation of the parts shown in the upper portion of Fig. 23, associated with the first die or templet that acts upon the fabric blank, the fabric support and the group of folder blades being omitted. Figure 25 is a view similar to Fig. 19 but showing the second die or templet that acts upon the fabric blanks and showing in section the part that supports this die or templet. Figure 26 is a detail view in elevation of the device for pressing the folded fabric blanks and parts associated with said device, one of the groups of folder blades and associated parts and the group of releasing cam fingers being shown beneath the pressing device. Figure 27 is a view on line 27—27 of Fig. 26. Figure 28 is a view in vertical section on the line 28—28 of Fig. 26. Figure 29 is a view in horizontal section on line 29—29 of Fig. 26. Figure 30 is a detail view in elevation showing the device for discharging the fabric blanks from the machine and showing partly in section and partly in elevation certain parts adjacent thereto and cooperating therewith. Figure 31 is a view in side elevation of the lower portion of the discharge device. Figure 32 is a view similar to Fig. 31 but showing certain of the parts in different positions. Figure 33 is a view in vertical section on line 33—33 of Fig. 32. Figure 34 is a view in side elevation of the discharge device showing the side opposite that illustrated in Fig. 31. Figure 35 is a perspective view of a partially folded fabric blank. Figure 36 is a perspective view of a fabric blank the edges of which have been completely folded.

The machine shown in the accompanying drawings is more particularly adapted for folding the edges of fabrics from which the pad portions of a certain type of men's garters are to be formed, an illustration of such pad blanks being shown in Figures 35 and 36 of the drawings.

Stated generally, the machine comprises a series of supports for the fabric blanks and groups or units of folder blades associated therewith and mounted upon a horizontally revoluble table that serves to successively move these groups or units past a series of superposed dies or templets over the edges of which the edges of the fabric blanks will be turned. When a fabric blank is placed over one of the groups or units of folder blades and a step by step movement is imparted to the revoluble table, the unit on which the fabric blank has been placed is moved successively beneath the several dies or templets, certain of the folder blades of the unit cooperating with the first die plate to fold certain of the edge portions of the fabric blank and the succeeding die or templet serving to cooperate with other folder blades to complete the folding of the edge of the fabric blank; after which the fabric blank is brought beneath a pressing device and, having been pressed, is brought into the path of discharge mechanism which removes it from the machine. The several groups or units of folder blades are of identical construction, and as the revoluble table moves these groups or units across the front of the machine, the operator sitting at such point will place a fabric blank upon the blank support of each group or unit as it passes before him, so that a number of blanks will be in process of having their edges folded at the same time.

While I have illustrated in the accompanying drawings and will describe in this specification the preferred embodiment of my invention in a form especially adapted for the folding of garter pad blanks, I wish it understood that without departure from the spirit of the invention, it can be adapted for the folding of the edges of fabric blanks of various kinds and that features of the invention can be employed without its adoption as an entirety.

Referring to the accompanying drawings, A designates the bed plate of the machine that is shown as mounted upon suitable legs $a$. From the corners of the bed plate A rise the vertical posts $a^2$, the upper ends of these posts being connected together by a top frame A'. Intermediate between the bed plate A and the top frame A' extends the two stationary frames H and P that are provided at their corners with perforated arms through which the corner posts of the main frame extend.

As shown, the top frame A' is formed at its rear with outwardly extending arms or brackets $a^5$, $a^6$ and $a^7$ formed integral therewith, the arms or brackets $a^6$ and $a^7$ being shown by dotted lines in Fig. 3. The arms or brackets $a^5$ and $a^6$ are provided with journal bearings for the ends of a countershaft 10 on which is fixed a gear wheel 11 (see Figs. 1 and 3). This gear wheel 11 meshes with a pinion 12 that is fixed to the drive shaft 13 that is journaled in bearings 14 and 15 that are bolted to the rear upright posts $a^2$ at a slight distance below the top frame A'. This drive shaft 13 carries at its outer end a drive pulley 16 to which revolution may be imparted from any suitable source of power, as for example, a small electric motor (not shown) that may be mounted upon the bracket 17 (see Figs. 1 and 3) fastened to the main frame near its base. Upon the drive shaft 13 at one side of the pinion 12 is fixed one of the disks 20 of a friction clutch, and if desired, this disk 20 may be formed integral with the pinion 12. The opposing disk 21 of the friction clutch is slidably mounted upon the drive shaft 13 and upon this shaft and adjacent the disk 21 is fixed a plate or hub 22 that carries pivoted arms 23 the free ends of which arms extend over the inclined surface of the clutch hub 24 that is keyed to the shaft in manner free to be shifted lengthwise thereof. The arms 23 are in the shape of elbow levers and the short members of these arms are adapted to bear upon and shift the friction plate 21. The clutch hub 24 is formed with a peripheral groove into which projects the yoke-shaped clutch shifter 25 (see Fig. 1) that is fixed to the rear end of a clutch rod 26. This rod 26 has its front and rear ends journaled in the downwardly turned ends of a bar 27 that is fastened to the top frame A' (see Figs. 1 and 3), and to the front end of the clutch rod 26 is fixed a hand lever 28 that will engage with the forwardly turned edge of a plate 29. The forwardly turned edge of this plate 29 is formed with notches to hold the hand lever 28 in either of its two positions. The plate 29 is of resilient metal and is conveniently secured at one end to the depending front portion of the bar 27, and the resiliency of the plate 29 permits the rod 28 to be shifted to the notches in the forwardly turned edge of the plate and to be held therein.

Upon the shaft 10 is fixed a bevel gear pinion 30 that meshes with teeth upon the under side of a gear wheel 31 that is fixed to the upper end of a vertical cam shaft 32. This cam shaft 32 (see Figs. 2 and 3) has its upper end journaled in the arm or bracket $a^7$ that projects rearwardly from the top frame A' and has its lower end journaled in a corresponding bracket $a^8$ that projects rearwardly from the base plate A. As shown, this cam shaft 32 has fixed thereon the several cams B, C, D, E and F and to the lower end of the shaft 32 is keyed a gear wheel 33.

The gear wheel 33 meshes with a gear wheel 34 that is fixed to the lower end of a shaft 35 that passes through the bed plate A of the main frame (see Figs. 1, 2 and 9 and 10) and through a boss $a^9$ rising from said bed plate, and to the top of this shaft 35 is fixed a plate 36 that carries at its periphery a pin 37. The purpose of the gear wheels 33 and 34 and the plate 36 is to impart, through the medium of the mechanism next to be described, a step-by-step rotation to the vertical shaft 40 that serves to support and move the several groups or units of folder blades, as will presently more fully appear.

The shaft 40 has its upper end journaled in a bearing 41 in the top frame A′ (see Figs. 2 and 3) and its lower end is journaled in and passes through the base plate A of the main frame, the upper and lower bearings for this shaft being such as to permit a slight vertical movement of the shaft for the purpose to be presently stated. Upon the shaft 40 near its lower portion is keyed a feed wheel 43 (see Figs. 2, 9, 10 and 11) from the under side of which depend a series of pins 44 that are spaced at equal distances apart and correspond in number and arrangement to the groups or units of folder blades to which the shaft 40 imparts a step-by-step revolution. To the pin 37 (see Figs. 9, 10 and 11) of the plate or disk 36 is pivotally connected one end of a link 46, the opposite end of which link is pivotally connected to a swinging bracket 47 that is pivotally mounted upon the shaft 40. By reference more particularly to Figs. 10 and 11, it will be seen that this bracket has upper and lower members that encircle the shaft 40 and are connected by a diagonally extending brace, and the outer end of the bracket 47 is provided with a chambered block 48 wherein is mounted a pivoted dog 49 that is forced normally upward by a spiral spring 49$^a$ so that its free end shall be in position to engage with the pins 44 depending from the feed wheel 43.

As shown, the gear wheel 33 (see Fig. 9) is twice the size of the gear wheel 34, hence each complete revolution of the shaft 32 produces two backward and forward movements of the bracket 47 and its dog 49. As will presently appear, however, the shaft 40 and the feed wheel 43 will be so lifted during one of the movements of the bracket 47 and dog 49 that the pins 44 will be above and out of the reach of the dog 49 and hence one of the movements of the dog is an idle movement. The feed wheel 43 has its periphery provided with a series of V-shaped notches 50 corresponding in number and arrangement to the pins 44, and above the bed plate A of the machine and pivotally connected to one of the corner posts thereof, is a stop arm 51 that carries at its free end a dog 52 having a V-shaped end adapted to enter the notches 50 of the feed wheel 43 (see Figs. 9, 10 and 11), this stop arm 51 being drawn normally towards the feed wheel 43 by a coil spring 53. Hence, it will be seen that when the feed wheel is revolved so as to bring one of its peripheral notches 50 opposite the beveled dog 52 on the stop arm 51, this dog 52 will enter the notch 50 and will stop and accurately position the feed wheel 43, the shaft 40 and the groups or units of folder blades carried by said shaft. To the end of the stop arm 51 is attached a releasing finger 54 that is adapted to be engaged by the outer edge of the end portion of a releasing lever 55 that is pivotally mounted, as at 56, upon a stud rising from the bed plate A of the main frame. The opposite arm of the releasing lever 55 carries an anti-friction roller 57 adapted to be engaged by the cam E mounted upon the shaft 32. When the cam E strikes the anti-friction roller 57, the releasing lever 55 will be turned about its pivot 56 and by contact of this lever 55 with the finger 54 will shift the stop arm 51 so as to move the dog 52 from engagement with the notches 50 of the feed wheel 43.

Upon the upper face of the releasing lever 55 is mounted a dash pot 60, the piston 61 of which has its outer end provided with a plate 63 (see Fig. 11) having an upturned outer end adapted to contact with the pins 44 depending from the under side of the feed wheel 43 when the feed wheel is in the lowered position shown. A coil spring 65 (see Fig. 11) having one end attached to the piston of the dash pot 60, has its opposite end attached to a block 66 fixed to the outer end of the releasing lever 55 and serves to draw the piston and piston rod of the dash pot normally outwardly. The function of the dash pot 60 and its pistom rod 61 is to check or ease the stop movement of the feed wheel 43, the shaft 40 and the parts carried thereby, and during the rotation of the feed wheel 43 (in its lowermost position), the pins 44 will successively contact with the outer end of the piston rod 61 and will gradually force inward the piston of the dash pot until, at the limit of the inward movement of its piston rod, a notch 50 on the feed wheel 43 is brought opposite the dog 52 carried by the stop arm 51. A coil spring 68 having one end attached to the releasing lever 55 (see Fig. 9) and having its opposite end connected to a pin 69 rising from the bed plate A of the main frame, serves to hold the anti-friction wheel 57 at the opposite end of the releasing lever in engagement with the cam E.

Secured to and depending from the under side of the frame H (see Figs. 2 and 10) at a point adjacent the periphery of the feed wheel 43 is a stop arm 69$^a$ having a beveled edge adapted to enter one of the notches 50 of the feed wheel 43 when the feed wheel has been lifted by the rising of the shaft 40 and when the dog 52 engages with the corresponding notch 50 at the opposite side of the feed wheel 43. When the feed wheel is in the lowered position (see Figs. 2 and 10), the stop arm 69$^a$ will not interfere with the rotation of the feed wheel, but when the feed wheel has been moved until one of the notches 50 is opposite the dog 52, the feed wheel will be lifted and the stop arm 69$^a$ will engage with the notch 50 immediately opposite it, the stop 69$^a$ serving also to prevent lifting of the feed wheel except when the notches are opposite the dog 52 and the stop 69$^a$.

The vertical shaft 40 that carries the groups or units of folder blades has imparted thereto not only a step-by-step rotation, but also a vertical movement, and this vertical movement of the shaft 40 is effected by mechanism next to be described, reference being had more particularly to Figs. 1, 2, 9, 14 and 15 of the drawings. With the cam F fixed adjacent the bottom of the cam shaft 32 engages a roller 70 that is journaled between the outer ends of the sliding bars 71 and 72 that are mounted immediately above the bed plate A of the main frame. See Figs. 13 and 14. The inner end of the lower bar 72 is extended and carries a cam block 73 which is adjustable longitudinally of the bar 72 by a screw 74 that is threaded into the cam block 73 and abuts a block 75 that is mounted between the bars 71 and 72. The cam block 73 at the inner end of the bar 72 projects between vertically arranged plates or arms 76 that extend upward through a slot in the bed plate A of the main frame and the beveled upper face of the cam 73 is adapted to contact with a roller 77 that is journaled between the upper ends of the arms 76. A friction plate 78 is preferably attached to the bedplate A for the bar 72 to slide upon. The lower bar 72 that carries the cam block 73 has its outer edges formed with grooves which engage anti-friction guide rollers 72$^a$ journaled upon studs rising from the bed plate A of the main frame (see Figs. 13-15). The lower ends of the plates or arms 76 are connected to a shaft-lifting bar 80 (see Figs. 1, 4 and 15) that is pivotally connected at its outer end to lugs 81 depending from the bottom plate A of the main frame, while the inner end of the bar 80 extends beneath and forms a step for the lower end of the vertical shaft 40 that carries the groups or units of folder blades. The shaft-lifting bar 80 (see Fig. 1) extends through a bracket or hanger 84 attached to the under side of the bed plate A and rests upon the upper end of a coil spring 85, the lower end of which bears upon the bracket 84.

From this construction, it will be seen that when the cam F is revolved and the cam block 73 is forced inward, the shaft-lifting bar 80 will be raised, carrying with it the vertical shaft 40 and the groups or units of folder blades supported thereby.

To the vertical shaft 40 is fixed a table or plate 90 having forwardly projecting radial arms 91 (see Figs. 6, 7, 16, 17 and 19), the table 90 and the arms 91 serving to carry the groups or units of folder blades and parts associated therewith, as will presently appear. In the embodiment of the invention illustrated in the accompanying drawings, five groups or units of folder blades are shown (see Fig. 6), and since the parts comprising each of these groups or units are identical in construction, a description of one group or unit will answer for all.

As shown, each group or unit comprises a base plate G that is secured to the upper face of the plate 90 and the arms 91. From this base plate G rise the posts $g$ on the upper ends of which are secured the top plate G' that is formed with a cutaway space $g'$ corresponding in a general way to the fabric blank that is to be folded. Upon the top of the plate G' are fixed the guides or blocks 93 and 94, the inner edges of which will correspond in outline with the outer edges of the fabric blank (see Figs. 6 and 16). From the base plate G also rise the posts $g^3$ on top of which is fixed a fabric blank support $g^4$ that is held at a slight distance below the opening $g'$ of the top plate G'. As shown, the upper face of the support $g^4$ is provided with a row of slightly raised teeth or projections $g^5$ that will mark or indent the fabric blank and prevent the blank from adhering too closely to the surface of the plate. Upon the top of the base plate G is fixed a series of radially disposed, open-ended, trough-shaped guides 95 corresponding in number to the folder blades that are employed, these trough-shaped guides being six for each group in the machine shown.

To the bottom of each of the guides 95 is fixed a channel-shaped hanger bracket 96 that passes through a slot formed in the base plate G beneath each guide 95 and upon the top of each guide 95 is mounted a reciprocating blade carrier 97 preferably formed of sheet metal with a depending end portion that fits between the walls of the guide 95. Each blade carrier 97 is connected to its corresponding guide 95 by links 98 arranged preferably upon both the inside and outside of the guide 95 and carrier 97, as clearly shown in Figs. 17 and 18 of the drawings. Through each guide 95 extends a blade-shifting lever 100 that may be conveniently formed of a channel-shaped piece of metal.

This lever 100 has journaled at its lower end an anti-friction roller 101 and the lever 100 is pivoted upon a pin 102 that passes through the lever and through the hanger bracket 96. The upper yoke-shaped end of each lever 100 engages a pin 103 that passes through the corresponding blade carrier 97 and a coil spring 104 connects the pins 102 and 103 and serves to normally draw the blade carrier down upon its guide 95 and hold it at the extremes of its movement. Each blade carrier 97 carries a folder blade mounted upon a block 105 secured to the top of the carrier 97. Each group or unit of folder blades has blades corresponding in number to the edges of the particular fabric blank to be folded. The present machine is shown as designed for the folding of the fabric blanks that form the garter pads W of the shape shown in Figs. 35 and 36 of the drawing, and as this garter pad has six sides or edges to be folded, each group of folder blades will comprise six different blades designated, respectively, 106, 107, 108, 109, 110 and 111 (see Figs. 16 and 17).

The levers 100, by mechanism to be presently described, serve not only to impart a radially reciprocating motion to the blades 106, 107, 108, 109, 110 and 111, but serve also to give a rising and falling motion to these blades as they are reciprocated, this rising and falling motion being due to the fact that as the blade carriers 97 are reciprocated by the movement of the upper ends of the levers 100, they are lifted away from the guides 95. The space between the folder blades 106, 107, 108, 109, 110 and 111 and the top plate G' permits of this slight vertical movement of the folder blades, the function of which is to enable the folder blades to better turn the edges of the fabric blank over the dies or templets that co-operate therewith.

The mechanism whereby the folder blades are reciprocated through the medium of the levers 100 will next be described, reference being had more particularly to Figs. 1, 2 and 8 of the drawings. To the corner posts of the main frame are radially connected the four corners $h$ of a grid or frame H, the front portion of which is shown with a V-shaped recess to straddle the vertically movable shaft 40. Upon the upper face of the frames H adjacent its corners are provided the slightly raised tracks 115 and 116 upon which travel the wheels of a reciprocating shifter frame K, the function of which frame is to raise the vertically movable frame M that carries upon its upper surface the cams or cam fingers that control the operation of the blade-shifting levers 100. At the four corners of the frame K are pivoted the wheels or rollers 118, 119 and 120 (see Figs. 1 and 2). The rollers 118 engage with the tracks 115 on the stationary grid or frame H; the rollers 119 travel on the tracks 116 and the rollers 120 are adapted to engage with the cams 121 that are fixed to and depend from the under side of the vertically movable grid or frame M at its four corners. This frame M (see Fig. 8) is provided at its corners with lugs $m$ that carry guide rollers $m'$ that travel in vertical grooves 124 formed in the corner posts of the main frame. Upon the frame M are mounted three plates 125, 126 and 127 that carry the cam fingers whereby the operation of the blade shifter levers 100 is controlled. The plate 125 carries three cam fingers 130, 131 and 132; the plate 126 carries three similar cam fingers 133, 134 and 135 and the plate 127 carries a group of releasing cam fingers 138, the purpose of which fingers is to retract the levers 100 and their corresponding folder blades to idle or normal position, as will hereinafter more fully appear.

To the rear edge of the reciprocating frame K (see Fig. 8) is connected a bracket $k$ carrying a roller $k'$ adapted to bear against the periphery of the cam D on the cam shaft 32. When the cam shaft 32 is revolved, the movement of the cam D causes the reciprocating frame K to be moved in the direction of the arrows in Figs. 2 and 8 and as the frame K is thus moved, its rollers 120 will ride against the inclined bearing faces of the cams 121 and cause the vertically movable frame M to be lifted. The descent of the vertically reciprocating frame M will occur because of its weight and it will force backward the reciprocating frame K, causing the roller $k'$ to bear against the periphery of the cam D. When the vertically movable frame M is lifted, the cam fingers 130, 131 and 132 upon the plate 125 (see Fig. 8) will, through the medium of the levers 100, cause the inward movement of the three folder blades 108, 109 and 110 of the group or unit of folder blades at such time immediately above these cam fingers (see Figs. 6 and 16 to 20). The folder blades 108 and 110 will move inwardly slightly in advance of the inward movement of the folder blade 109. This will cause the edges $w'$ and $w^2$ of the fabric blank W (see Fig. 35) to be folded before the edge $w$ of the fabric blank is folded. This movement of certain of the folder blades in advance of others is effected by varying the height of the cam fingers, since obviously the highest cam fingers will first shift their corresponding levers 100 to actuate the folder blades.

When this group or unit of folder blades, by the rotation of the vertical shaft 40, is brought above the next succeeding plate 126 (see Fig. 8), the cam fingers 133, 134 and 135 will, through the medium of the corresponding levers 100, move inward the folder blades 106, 107 and 111, the inward movement of the folder blades 107 and 111 slightly preceding the inward movement of the folder blade 106, to cause the laying of the fabric folds $w^3$ and $w^4$ in advance of the fold $w^5$. These several movements of the folder blades will cause the folding of the edges of the fabric blank W, as shown in Fig. 36, as will hereinafter more fully appear. When by the further rotation of the vertical shaft 40, this group or unit of folder blades is brought above the plate 127 carrying the releasing cam fingers 138, all of the shifting levers 100 will be reversely moved so as to restore the folder blades to the normal or idle position. By mechanism to be presently described, the fabric blank, folded as indicated in Fig. 36 of the drawings, will be carried by the continued step-by-step revolution of the vertical shaft 40, to such positions that the folds of the fabric blank will be pressed and the blank subsequently removed from the machine.

The dies or templets that cooperate with the folder blades in the folding of the fabric blanks, and the mechanism for operating the same, will next be described, reference being had more particularly to Figs. 1, 2, 4, 5 and 19, to 22 of the drawings. Across the upper portion of the main frame extends a stationary frame or plate P, the four corners of which are rigidly connected to the four vertical corner posts of the main frame, as at $p$. The front of this frame P is formed with a V-shaped recess through which passes the vertical shaft 40 (see Fig. 4). Upon the upper surface of the frame or plate P at its corners are the tracks $p'$ and the raised guide rails $p^2$. Upon the tracks $p'$ travel the rollers 140 that are journaled at the corners of a reciprocating frame R and the rails $p^2$ engage the horizontal guide rollers 141 that are journaled upon studs depending from the corners of the reciprocating frame R. To the rear end of the frame R is secured a bracket $r$ carrying a roller $r'$ that engages with the periphery of the cam B that is secured to the cam shaft 32 and when, by the revolution of the cam shaft 32, the larger part of the cam B engages with the roller $r'$, the reciprocating frame R will be moved in the direction of the arrow, Fig. 5. At the corners of the reciprocating frame R are carried the vertical rollers 145 that will engage with the inclined faces of the cam plates 146 secured to and depending from the corners of the vertically movable frame S (see Figs. 1, 2, 3 and 5). From the four corners of the frame S project the lugs $s$ that carry the rollers $s'$, the beveled peripheries of which travel in corresponding vertical grooves $s^2$ in the four corner posts of the main frame.

To the under side of the frame S are attached the bars 148 having threaded openings therein to receive the upper threaded ends of the rods 149 (see Figs. 3, 23 and 24) whereby the shifting of the die or templet, as the frame S is raised and lowered, will be effected in a manner to be presently described. It will be readily seen that as the cam B is revolved by the operation of the cam shaft 32 (see Figs. 2, 4 and 5), the contact of the cam B with the roller $r'$ at the rear end of the reciprocating frame R will cause the reciprocating frame R to move forward and the engagement of the rollers 145 with the inclined faces of the cam plates 146 will cause the lifting of the vertically movable frame S. The weight of this frame will cause it to descend as the narrow portion of the cam B engages with the roller $r$.

To the under side of the stationary plate or frame P, and beneath openings formed therein, are attached the plates 150, 151 and 152 (see Figs. 1, 2, 4, 23 and 24), the plates 150 and 151 serving to support the dies or templets and associated parts and the plate 152 serving to support a heating and pressing device for pressing the edges of the fabric blanks after they have been folded. Except as to the precise shape of the movable dies carried beneath the plates 150 and 151 respectively, the parts associated with these dies are substantially identical, so that a description of one will answer for both. The die or templet beneath the plate 150 is designed to cooperate with the folder blades 108, 109 and 110 (see Fig. 16) hereinbefore described in folding the edges $w$, $w'$ and $w^2$ of the fabric blank as shown in Fig. 35, while the die or templet and associated parts suspended above the plate 151 is designed to cooperate with the folder blades 106, 107 and 111 (see Fig. 16) hereinbefore described in folding the edges $w^3$, $w^4$ and $w^5$ of the fabric blank (see Fig. 36).

By reference to Figs. 6 and 7$^a$ of the drawings, it will be seen that the groups or units of folder blades and associated parts are so disposed that the fabric blanks W will be placed upon the tables of the groups or units with the curved portion of the fabric blank W towards the center of revolution, and in operation, the vertical shaft 40 will rotate the groups or units of folder blades in the direction shown by the arrow in Fig. 6. Each die or templet is so supported that after the edges of the fabric blank have been folded over it, this die or templet will be withdrawn from beneath said folded edges. Hence, it will be seen that the die or templet that cooperates in forming the folded edges $w$, $w'$ and $w^2$ of the fabric blank and which is at the right of the machine (see Figs. 1 and 7$^a$) and first acts upon the blank, will be so supported as to swing outwardly to release it from the folds $w$, $w'$ and $w^2$, while the next die or templet that cooperates in forming the folds $w^3$, $w^4$ and $w^5$ must be swung inwardly to release said die or templet from said folded edges of the fabric blank. Aside, however, from the precise shapes of the dies or templets and the fact that one plate is swung inwardly to release it from the folded blank, while the other plate is swung outwardly, the mechanism for shifting the dies or templets and the parts associated with them are the same for each die or templet. The same reference numerals will therefore be used in designating the parts associated with the dies or templets.

Beneath each of the plates 150 and 151 are secured the bars 154 and 155 between which are riveted, as at 156, the upper ends of the bars 157 and 158, the lower ends of which have secured thereto the bars 159 (see Figs. 23 and 24). These bars 159 are braced by the rods 160 that extend upwardly therefrom and have their upper ends fastened, as at 161, to a plate 150 (or 151) above them. To the bar 158 is secured, as by pins 162, a channel-shaped bar 163 the lower portion of which is formed with outwardly extending arms 164 that are fastened, as at 165, to a plate 166 from the ends of which depend the pins or lugs 167 that have secured thereto the blank holder or plate 168 (see Figs. 21 and 22) that is formed of very thin sheet metal and although smaller, corresponds in general outline to the shape of the fabric blank.

Between the bars 157 and 158 is arranged a die shifter bar 170 (see Figs. 23 and 24) the upper end of which is pivoted, as at 171, between the bars 154 and 155. The lower end of the die shifter bar 170 carries a block 173 having a depending portion 174 formed with laterally extending arms 175 (see Fig. 7ª) to the under side of which is secured a die or die plate 176, this die plate being arranged immediately above the blank holder 168. The die shifter 170 is formed with a cam slot 180 adapted to receive a pin 181 projecting from the expanded lower end of a bar 182 the upper end of which is pivoted, as at 183, to the threaded rod 149 depending from the bar 148 beneath the frame S. The pin 181 that passes through the shifter bar 170 passes also through the bars 184 and 185 arranged upon opposite sides of the bars 170 and 157 and through these bars 184 and 185 extends a pin 186 that passes through a vertical slot 187 formed in the bar 157. From this construction, it will be seen that when the vertically movable frame S is raised in manner hereinbefore described, it will raise and lower the rod 149 and bar 182, causing the pins 181 and 186 to ride respectively along the slots 180 and 187. This vertically reciprocating movement of the pins 181 and 186 will cause the pin 181, as it moves in the cam slot 180, to swing the die shifter bar 170 and the die carrier at the lower end thereof, back and forth and on the backward movement, the die 176 will be withdrawn from beneath the folded edges of the fabric blank.

The operation of the machine in folding the edges of the fabric blank, such as illustrated in Fig. 36 of the drawings, will now be described, after which the construction and operation of the mechanism that presses the edges of the fabric blanks after they have been folded, and the construction and mode of operation of the mechanism for discharging the folded and pressed fabric blanks from the machine will then be set forth.

Assuming that the group or unit of folder blades shown at the bottom of Fig. 6 of the drawing is at the front of the machine (Fig. 1), the operator will place a fabric blank to be folded above the blank support $g^4$ of the group or unit of folder blades immediately in front of him, the guide blocks 93 and 94 serving to position the fabric blank with its outer (unturned) edges resting upon the edges of the opening in the plate G' above the support $g^4$ (see Figs. 16 to 25). When the fabric blank has thus been placed in position, the vertical shaft 40 will have one-fifth of a revolution imparted thereto through the operation of the feed wheel 43 and mechanism actuating the same (see Fig. 9) hereinbefore described. This will bring the fabric blank immediately beneath the die or templet at the right of the operator and nearest the front of the machine (see Fig. 7ª) and at such time, the dog 52 will enter the corresponding notch 50 of the feed wheel 43 and accurately hold the wheel, the vertical shaft 40 and the parts carried thereby against further revolution. When the fabric blank is thus brought beneath the first die or templet, the vertical shaft 40 will be lifted, carrying with it the table 90 and the several groups or units of folder blades supported thereby. This lifting of the vertical shaft 40 is effected by the mechanism hereinbefore described and illustrated more particularly in Figs. 10 to 13 of the drawings. That is to say, the cam F on the cam shaft 32 will at such time cause the cam block 73 engaging the roller 77, to lift the lever 80, which by its engagement with the lower end of the vertical shaft 40 will lift such shaft; and this lifting of the shaft 40 will cause the group or unit of folder blades upon which the fabric blank has been placed to rise until the blank holder or presser foot 168 forced the fabric blank down onto the support $g^4$. At such time, the die 176 is projected beyond the free edge of the blank holder 168, as illustrated in Figs. 7ª and 20 of the drawings, and the edge of the fabric blank W is turned somewhat upward, as shown in Fig. 20. It will be understood that at the time the support $g^4$ with the fabric blank thereon has been thus lifted, all the folder blades are in retracted position. At such time, however, the cam fingers 130, 131 and 132 (see Figs. 1, 8 and 19 to 22) will be immediately beneath the rollers 101 on the lower ends of the blade-shifting levers 100 by which the folder blades 108, 109 and 110 will be actuated, these levers being at such time in the position shown in Figs. 17 and 20 of the drawings.

As shown, the several cam fingers 130, 131 and 132 are made of different heights (see Fig. 1) in order to cause the folder blades to act upon the edges of the fabric blank successively and thus insure an accurate folding of the corner portions of the blanks. The cam finger 132 (see Figs. 1 and 8) that actuates the folder blade 108 (see Fig. 16) is the longest of the group and hence as the cam fingers rise, the folder blade 108 will first engage the upturned edge of the fabric blank. The cam finger 130 that actuates the folder blade 110 is but slightly shorter than the cam finger 132 so that the inward movement of the folder blade 108 will begin immediately after the beginning of the inward movement of the folder blade 110; and the cam finger 131, being the shortest of the group, will not actuate the folder blade 109 until after the folder blades 108 and 110 have turned inwardly the edges of the fabric blank, thus insuring that the part of the fabric blank folded by the folder blade 109 shall give square-cornered folds to the fabric blank, as shown in Figs. 35 and 36 of the drawings. The rising of the group of cam fingers 130, 131 and 132 will shift the folder blades from the position shown in Figs. 16, 17 and 20 to the position shown in Fig. 21 of the drawings, and the edges $w$, $w'$ and $w^2$ of the fabric blank will be folded, as shown in Fig. 35, over the corresponding edge portions of the die 176.

The lifting of the cam fingers to cause the operation of the folder blades is effected by the raising of the vertically movable frame M whereon the several groups of cam fingers are mounted, the mechanism for thus moving the frame M comprising the cam plates 121 at the corners of said frame and the reciprocating frame K actuated by the cam D (see Figs. 2 and 8). After the edge portions $w$, $w'$ and $w^2$ of the fabric blank have been thus folded, the die shifter bar 170 (see Fig. 23) will be oscillated about its pivot point 171 to cause the die 176 to pass from beneath the folder blades 108, 109 and 110 to the retracted position shown in Fig. 23 of the drawings. This oscillation of the die shifter bar 170 is effected by the lifting of the vertically movable frame S that is lifted when the reciprocating frame R is actuated by the cam B, in the manner hereinbefore described (see Figs. 2 and 4). As the pin 181 is drawn upward by the bar 182 connected to the frame S, it rides along the inclined face of the cam slot 180 and forces the shifter bar to retract the die 176 from beneath the folded edges of the fabric blank and from beneath the folder blades 108, 109 and 110. When the die has been brought to the retracted position shown in Fig. 23 of the drawings, the shaft 40 and the table 90 carrying the groups or units of folder blades will descend, while at the same time, the groups or units of cam fingers will also descend and the weight of the vertically movable frame M that carries the cam fingers will serve to move the reciprocating frame K backward, as the shallow portion of the cam D comes opposite the roller at the rear of the frame K (see Fig. 2).

When the groups or units of folder blades and the frame carrying the several groups of cam fingers reach the limit of their downward movement, the dog 52 and the stop arm $69^a$ (see Fig. 10) will be relieved from engagement with the notches 50 of the feed wheel 43 by the mechanism shown in Fig. 9 of the drawings, and a further advance of the feed wheel 43 one-fifth of a revolution will bring the group or unit of folder blades on which the fabric blank has been placed immediately above the next group of cam fingers and immediately beneath the second die or templet (shown at the upper right hand corner of Fig. $7^a$) that cooperates in forming the folded edges $w^3$, $w^4$ and $w^5$ of the fabric blank shown in Fig. 36. These cam fingers which, like all the other cam fingers, are carried by the vertically movable frame M, are similar in construction to the cam fingers 130, 131 and 132 hereinbefore described and are of such relative lengths as to insure that the folder blades 106, 107 and 111 shall be operated in such timed relation as to cause the fabric edges $w^3$, $w^4$ and $w^5$ of the blank W (see Fig. 36) to be folded with overlying corners as shown.

The operation of the mechanism that actuates the folder blades 106, 107 and 111 is the same as the operation of the mechanism which actuates the folder blades 108, 109 and 110 as before described; but the die that cooperates with the folder blades 106, 107 and 111 will be of somewhat different shape from the die that cooperates with the other three folder blades, as shown by the upper right hand corner of Fig. $7^a$ of the drawings, and this die will be swung radially inward toward the shaft 40 to withdraw its edges from beneath the folded edges of the fabric blank, instead of being withdrawn radially outwardly, as is the die that cooperates with the folder blades 108, 109 and 110, as above described. The second die that cooperates in folding the edges $w^3$, $w^4$ and $w^5$ of the fabric blank is located immediately beneath the plate 151, indicated in Fig. 4 of the drawings. By reference to Fig. $7^a$ of the drawings, it will be seen that the shape of the blank holder or presser foot 168 that is associated with the second die or templet (shown at the right hand upper corner of Fig. 7ª), is slightly different from the blank holder or presser foot 168 associated with the first die or templet. As shown, the second die or templet 168 has inwardly extending arms that are connected directly to the posts depending from the yoke-shaped lower ends 164 of the member 163, and it will also be noticed that there is no plate 166 connected to the bottoms of the arms 164, as is the case with the presser foot support shown associated with the first die or templet that cooperates with the folder blades.

After all the folder blades have been moved to the inward position through the medium of the two groups of cam fingers as above described, and all the edges of the fabric blank have been folded, the table 90 and the groups or units of folder blades and the several groups of cam fingers will descend, after which a further one-fifth revolution will be imparted to the vertical shaft 40 and the groups of folder blades, so as to carry the completely folded fabric blank beneath a pressing device for pressing and setting the folded edges of the blank, and above a group of cam fingers that serve to retract all of the folder blades to the open or idle position.

The mechanism for pressing the folded edges of the fabric blank will next be described, reference being had more particularly to Figs. 1, 2 and 26 of the drawings: To the under side of the stationary frame P and beneath an opening thereof is attached a plate 152 (see Figs. 4 and 26) from which depends a frame consisting of the top and bottom plates 201 and 202, the intermediate plate 203 and the vertical rods 204 that securely connect these plates together. Through the bottom plate 202 passes in a manner free to slide a rod 205 the lower end of which is adapted to bear upon a pressing device T. This pressing device T is formed of a series of plates secured together and of such construction as to form an electrical resistance element for the purpose of heating the lowermost plate 206 that is to press the folded edges of the fabric blank. To the top plate 207 of the pressing device T is connected a plate 208 carrying binder posts 209 to which will be connected electric conducting wires 210 that supply the current for heating the pressing device T. To the top of the plate 207 are rigidly connected the vertical sleeves 212 that pass loosely upward through the plate 202, these sleeves carrying rings or collars 213 connected to the sleeves by set screws 214. Through the sleeves 212 and through the pressing device T loosely pass the rods 215, the upper ends of which rods pass through holes formed in the intermediate plate 203. Upon the rods 215 are mounted the coil springs 216, the upper ends of which bear upon the under side of the plate 203, while their lower ends bear upon the collars 217 that are adjustably connected by set screws to the rods 215. To the rod 205 is adjustably connected (see Fig. 29) a collar 220 which limits the downward movement of the rod and to the upper end of the rod 205 is secured the lower end of a yoke-shaped bar 221 in the upper end of which is journaled the anti-friction roller 222. The upper ends of the arms of this yoke-shaped bar 221 (see Fig. 26) are slotted to permit the upper ends of the bar 221 to straddle the pintle 224 of an anti-friction roller 225 that is journaled in the bracket 226 secured to the plate 201. Between the arms of the yoke-shaped bar 221 and between the rollers 222 and 225 extends one end of a cam shifter bar 227, the opposite yoke-shaped end of this bar 227 straddling the cam shaft 32 (see Fig. 27). This cam shifter bar 227 has mounted upon its upper face an anti-friction roller 230 adapted to engage the periphery of a cam C (see Figs. 2, 26 and 27) that is mounted upon the cam shaft 32. A collar 231 on the cam shaft 32 serves to support the outer end of the bar 227. The roller 230 is held in engagement with the periphery of the cam C by a coil spring 233, one end of which is connected to the bar 227 and the opposite end of which is connected to a bar or bracket 234 secured to the plate 152. To the under side of the bar 227 is secured the cam 235 that is adapted to bear upon the periphery of the roller 222 and force the pressing device T downward to complete the pressing of the folded edges of the fabric blank.

The operation of the mechanism for pressing the folded edges of the fabric blank will be seen to be as follows, it being assumed that a group or unit of folder blades engaging the edges of a fabric blank (folded thereby as above described) has been brought immediately beneath the pressing device T and in the position shown by Fig. 26 of the drawings. At the time the fabric blank is brought beneath the pressing device T to have its folded edges pressed, the groups or units of folder blades and the groups of cam fingers are in the lowermost position shown by Figs. 1 and 26 of the drawings. The operation of the cam shaft 32 will cause the cam F (see Fig. 2) to raise the bar 80 at the lower end of the vertical shaft 40 and thus lift the groups or units of folder blades towards the pressing device T. At the same time, also, the cam D on the cam shaft 32 will begin to move inward the reciprocating frame K and cause the cams 121 to raise the groups of cam fingers mounted upon the vertically reciprocating frame M which straddles and moves independently of the shaft 40, but the shape and timed relation of the cams F and D are such that the folder blades will begin to be raised slightly in advance of the raising of the fingers. As the units of folder blades are thus raised, the fabric blank carried by the support and groups of folder blades immediately beneath the pressing device T will contact with the lower ends of the rods 215 (see Fig. 26) and will push these rods upward against the action of the coil springs 216 until in the upward movement of the vertical shaft 40, the bottom plate 206 of the pressing device T bears upon the tops of the folder blades that overlap the folded edges of the fabric blank. The continued upward movement of the group of folder blades carrying the fabric blank will slightly lift the pressing device, this being permitted because the vertical sleeves 212 that rise from the top of the pressing device T pass freely through the plate 202. About the time that the vertical shaft 40 and parts carried thereby complete their upward movement, the group of releasing cam fingers 138 will contact with the rollers 101 at the lower end of the levers 100 that operate the folder blades and will cause all of these levers to be shifted inwardly so as to move the folder blades from engagement with the folded edges of the fabric blank and back to normal or idle position.

The several cam fingers 138 are of somewhat different heights so that certain of the folder blades are released slightly in advance of others. Thus, preferably the folder blades that effect the folds $w$, $w^3$ and $w^4$ of the fabric blank (see Fig. 36) will be first retracted and thereafter the retraction of the folder blades that form the remaining folds of the fabric blank W will occur. Immediately after the folder blades have thus been retracted from engagement with the folds of the fabric blank and while the vertical shaft 40 and parts carried thereby are still in raised position, the cam wheel C on the cam shaft 32 (see Fig. 26) will force inward the bar 227 and cause the cam 235 to engage the roller 222 at the upper end of the rod 205 and cause the downward movement of this rod 205 to force the pressing device T with considerable pressure against the folded edges of the fabric blank from which the folder blades have been withdrawn. This downward pressure of the heated pressing device T against the fabric blank will continue so long as the roller 230 is engaged by the broad portion of the cam C (see Fig. 27), but as soon as the shallow part of the cam C comes opposite the roller 230, the spring 233 will withdraw the bar 227 and move the cam 235 from above the roller 222. Before the broad part of the cam C passes from engagement with the roller 230, the shallow part of the cam D (see Figs. 2 and 8) will begin to engage the roller at the rear end of the frame K and will allow this frame to move rearwardly so as to permit the vertically movable frame M to descend and carry with it the groups of cam fingers; and about the time the frame M has reached the limit of its downward movement, the shallow portion of the cam F (see Figs. 2 and 13) will begin to come opposite the roller 70 and allow the backward movement of the cam 73 and the downward movement of the vertical shaft 40 and the groups or units of folder blades carried thereby, thus bringing the parts to the position shown in Figs. 1 and 2 of the drawings. The rods 215 that pass through the pressing device T will be forced downward as the folder blades descend and these rods will prevent the sticking of the fabric blank to the under side of the pressing device.

The mechanism whereby the folded and pressed fabric blank will be discharged from the machine will next be described, it being understood that immediately after the groups of folder blades have passed to the lowermost position, a further one-fifth revolution will be imparted to the vertical shaft 40 so that the fabric blank last acted upon will be brought into position to be engaged by the device that discharges the blanks from the machine. The construction of this discharging device and its operating mechanism will best be understood by reference to Figs. 2 and 30-33 of the drawings. Beneath the vertically movable frame S near its front are secured the bars 250 in the outer ends of which is journaled a rock shaft 251 having a squared central portion to which is secured the upper end of a swinging arm 252 that supports the carrier for the discharge pins 253. To the shaft 251 is fixed an arm 255 whereby the swinging arm 252 will be actuated. By reference to Fig. 30, it will be seen that the arm 255 projects inward to such position that when the vertically movable frame S is raised, the arm 255 will be struck by the depending bracket 256 that is secured to the under side of the top frame A' and will cause the swinging arm 252 to move from the position shown by full lines to the position shown by dotted lines in Fig. 30. A coil spring 257 that extends between the arm 252 and the bar 250 serves to retract the swinging arm 252 to vertical position when the frame S is lowered. Each of the pins 253 is held between a pair of plates 260 and each pair of these plates 260 is pivotally mounted, as at 261, on a pin carrier plate 262 that is attached to a bar 263 secured to the lower end of the swinging arm 252. The lower portion of the bar 263 is bent outwardly (see Fig. 33) and passes through a slot 264 formed in the plate 262, and to the lower end of this bar 263 are secured the pins 265 that pass through a slot 264ª in the plate 262 (see Fig. 32), these two pins 265 extending between the lugs 266 formed on the inner ends of the plates 260. As shown (see Fig. 34), the ends of the screws that unite the plates 260 and hold the pins 253 in place pass through short links 267 that are free to move within slots 268 formed in the lower portion of the plate 262. The bar 263 is held in engagement with the plate 262 (in such manner that the plate 262 may reciprocate vertically with respect to the bar 263) by the screws 269 that pass through a bar 270 on the back of the plate 262, through a long vertical slot in the plate 262 (shown by dotted lines in Fig. 34) and into the bar 263. In the lugs 272 of a bracket 273 fastened to the bar 263 is pivotally mounted a rock shaft 274. The shorter member 275 of this rock shaft 274 passes loosely within a hole formed in the plate 262, while the longer member 276 of the rock arm projects upwardly as shown. The plate 262 is shown as formed with a flange about its edge, the bottom of this flange being formed with slots through which the pins 253 project diagonally and in opposite directions.

The movement of the pin carrier plate 262 controls the position of the pivoted plates 260 and of the pins 253 carried thereby. When the upper member 276 of the rock arm is approximately parallel with the plate 262, the pins 253 are in the retracted position shown in Fig. 31 of the drawings; but when pressure is brought upon the bottom edge of the plate 262, this plate will be moved slightly upward with respect to the arm 263 and such relative movement of the plate 262 and arm 263 will cause the pins 253 to move in downward and outward direction from the position shown in Fig. 31 to the position shown in Fig. 32.

When a fabric blank, with its edges folded and pressed as above described, is brought by a group or unit of folder blades beneath the plate 262, the rising of the vertical shaft 40 carrying with it the groups or units of folder blades, will lift the fabric blank until the blank bears against the bottom flanged portion of the plate 262, which plate is at such time in the position shown in Figs. 2, 30 and 31 of the drawings, the rock arm being in the position illustrated by dotted lines in Fig. 30. The pressure of the fabric blank upon the lower edge of the plate 262 will cause this plate to move upward with respect to the bar 263 and will cause the pins 253 to swing outwardly and downwardly about the pivots 261 and engage the fabric blank.

Shortly after the vertical shaft 40 and parts carried thereby have completed the limit of their upward movement, the broader portion of the cam B (see Figs. 2 and 4) will begin to move the reciprocating frame R forwardly and will cause the cams 146 to raise the vertically reciprocating frame S, which will carry upward with it the swinging arm 252 and the fabric blank, at such time held by the pins 253. As this upward movement of the frame S continues, the arm 255 (see Fig. 30) will contact with the bracket 256 and will cause the swinging arm 252 to move outward to the position shown by dotted lines in Fig. 30, carrying the fabric blank with it. As the swinging arms 252 reaches the limit of its outward movement, the longer member 276 of the rock shaft 274 will contact with a bar 280 that projects inwardly from the outer portion of the bracket 281 that is secured to the side of the main frame of the machine near its front. This contact of the member 276 of the rock shaft 274 with the bar 280 will cause the rock shaft 274 to turn until its longer member 276 is brought to the position shown by dotted lines in Fig. 31 and will cause the plate 262 to move downwardly with respect to the bar 263 and the pivot plates 260 to withdraw the pins 253 to the retracted position shown in Fig. 31. As the pins 253 are thus withdrawn from the fabric blank, this blank will drop away into a receptacle that will be provided at the side of the machine.

It will be understood that as each group or unit of folder blades passes across the front of the machine in the step-by-step revolution of the vertical shaft and table 90, whereby the groups or units of folder blades are carried, the operator will place a fabric blank between the guides 93 and 94 at the front and back of the folder blades (see Fig. 6), and as each fabric blank is successively brought beneath the dies or templets, beneath the pressing device and beneath the discharge mechanism, the edges of such blank will be folded and pressed and the blank will be discharged from the machine in manner hereinbefore described.

What I claim as new and desire to secure by Letters Patent is:

1. In a folding machine for fabric blanks, the combination of a plurality of supports for said fabric blanks, means for revolving said supports in a horizontal plane, means for folding the fabric blanks comprising two elements, viz, a folder blade and a die or templet, one of said elements being associated and revoluble with said supports past the other of said elements and means for actuating said elements in time action.

2. In a folding machine for fabric blanks, the combination of a plurality of supports for said fabric blanks, means for revolving said fabric blanks in a horizontal plane, means for folding the fabric blanks comprising two elements, viz, a folder blade and a die or templet, one of said elements being associated and revoluble with said supports past the other of said elements, means for intermittently imparting a vertical movement to one of said elements to bring them into cooperative relation for folding the fabric blanks and means for actuating said elements in timed relation.

3. In a folding machine for fabric blanks, the combination of a plurality of supports for said fabric blanks, means for revolving said supports in a horizontal plane about a common axis, means for folding the fabric blanks comprising two elements, viz, folder blades and a die or templet, one of said elements being associated and revoluble with said supports past the other of said elements, means for imparting a verticl movement to one of said elements to bring them together for folding the fabric blanks, and means for actuating said folder blades when said elements have been brought together.

4. In a folding machine for fabric blanks, the combination of a plurality of supports for said fabric blanks, means for revolving said supports in a horizontal plane about a common axis, means for folding the fabric blanks comprising two elements, viz, folder blades and a die or templet, one of said elements being associated and revoluble with said supports past the other of said elements, and cam mechanism for imparting a vertical movement to one of said elements to bring it into cooperative relation with the other of said elements to fold the fabric blanks.

5. In a folding machine for fabric blanks, the combination of a plurality of supports for said fabric blanks, means for revolving said supports in a horizontal plane about a common axis, means for folding the fabric blanks comprising two elements, viz, a folder blade and a die or templet, one of said elements being associated and revoluble with said supports past the other of said elements, and means stationarily held with respect to the revoluble movement of said supports for pressing the folded edges of the fabric blanks.

6. In a folding machine for fabric blanks, the combination of a plurality of supports for said fabric blanks, means for revolving said supports in a horizontal plane about a common axis, means for folding the fabric blanks comprising two elements, viz, a plurality of groups of folder blades associated and revoluble with said supports, and a plurality of dies or templets held stationarily reltive to the revoluble movement of said supports, and means for imparting a step-by-step revolution to said supports beneath said dies or templets.

7. In a folding machine for fabric blanks, the combination of a plurality of supports for said fabric blanks, a vertical shaft to which said supports are connected, means for imparting a step-by-step revolution to said vertical shaft, means for folding the fabric blanks comprising two elements, viz, a plurality of groups of folder blades associated and revoluble with said supports and die or templet mechanism held stationarily relative to the revoluble movement of said supports, and means for imparting a step-by-step revolution and a vertical movement to said shaft in order to bring said folder blades and die or templet mechanism into operative relation.

8. In a folding machine for fabric blanks, the combination of a plurality of supports for said fabric blanks, means for revolving said supports, means for folding the fabric blanks comprising two elements, viz, folder blades and a die or templet, one of said elements being associated and revoluble with said supports and the other of said elements being held stationarily relative to the revoluble movement of said supports, a pressing device held stationarily relative to the revoluble movement of said supports, a discharge device for removing the fabric blanks from said supports, and means for imparting a step-by-step revolution to said supports to bring each of said supports successively opposite a die or templet, the pressing device and the discharge device.

9. In a folding machine for fabric blanks, the combination of a plurality of supports for said fabric blanks, means for revolving said supports in a horizontal plane about a common axis, means for folding the fabric blanks comprising a plurality of groups of folder blades associated and revoluble with said supports, a plurality of dies or templets arranged at a distance apart and held against movement with said supports, means for moving said supports by a step-by-step motion successively beneath said dies or templets, means for raising and lowering said supports and said folder blades into position to engage said dies or templets, means for shifting said folder blades to fold the edges of the fabric blank over said dies or templets, and means for withdrawing said dies or templets from the folded edges of the fabric blanks.

10. In a folding machine for fabric blanks, the combination of a revoluble shaft, a plurality of groups of folder blades connected to said shaft and arranged to revolve in a horizontal plane, a plurality of dies or templets arranged at a distance apart and above said groups of folder blades, means for lifting said groups of folder blades to bring them into cooperative relation to said dies or templets, means for shifting said folder blades to cause them to fold the edges of the fabric blanks over said dies or templets, means for withdrawing said dies or templets from beneath the folded edges of the fabric blanks, and means for automatically advancing the groups of folder blades successively beneath said dies or templets.

11. In a folding machine for fabric blanks, the combination of a plurality of supports for said fabric blanks, a plurality of folder blades associated and revoluble with said supports, a plurality of dies or templets spaced at distances apart above said supports, means for shifting said folder blades to fold the edges of the fabric blanks over said dies or templets, means for withdrawing said dies or templets from the folded edges of said fabric blanks, a pressing device arranged above said supports and spaced from said dies or templets, and means for imparting a step-by-step rotation to said supports corresponding to the distance that separates said dies or templets from each other and from the pressing device.

12. In a folding machine for fabric blanks, the combination of a plurality of supports for said fabric blanks, means for imparting a step-by-step movement to said supports, means for folding the fabric blanks comprising two elements, viz, folder blades and a die or templet, one of said elements being associated and revoluble with said supports, means for actuating said folder blades, a discharge device for removing the fabric blanks from said supports, means for imparting a step-by-step movement to said supports, and means for intermittently actuating said discharge device to eject the fabric blanks from said supports.

13. In a folding machine for fabric blanks, the combination of a plurality of groups of folder blades, a plurality of dies or templets, means for operating part of the folder blades of each group to coact with one of said dies or templets to fold a portion of the fabric blank, means for operating other of said folder blades of each group to coact with another of said dies or templets to fold another portion of said blank, and means for withdrawing the dies or templets from the folded edges of the blank.

14. In a folding machine for fabric blanks, the combination of a plurality of groups of folder blades, a plurality of dies or templets, means for operating part of the folder blades of each group to coact with one of said dies or templets to fold a portion of the fabric blank, means for operating other of said folder blades of each group to coact with another of said dies or templets to fold another portion of said blank, means for withdrawing the dies or templets from the folded edges of the blank, and means for bringing the groups of folder blades and the dies or templets successively into operative relation.

15. In a folding machine for fabric blanks, the combination of a plurality of groups of folder blades, a revoluble support for said groups of folder blades, a plurality of dies or templets for cooperating with said folder blades, and means for imparting revolution in a horizontal plane to said groups of folder blades past said dies or templets.

16. In a folding machine for fabric blanks, the combination of a vertical shaft, means for imparting revolution to said shaft, a plurality of folding mechanisms connected to said shaft and adapted to revolve in a horizontal plane, means for cooperating with said folding mechanisms to fold the fabric blanks, and means for moving said folding mechanisms with a step-by-step motion past said cooperating means.

17. In a folding machine for fabric blanks, the combination of a plurality of groups of folder blades, a revoluble support for said groups of folder blades, means for imparting a step-by-step revolution to said folder blades in a horizontal plane, a die or templet arranged above said groups of folder blades, and means for raising said folder blades to cooperate with said die or templet.

18. In a folding machine for fabric blanks, the combination of a plurality of folder blades, a revoluble support for said folder blades, means for cooperating with said folder blades to fold the fabric blanks, means for pressing the folded portions of the fabric blanks, and means for moving said folder blades past said cooperating means and past said pressing means.

19. In a folding machine for fabric blanks, the combination of a plurality of folder blades, a revoluble support for said folder blades, means for cooperating with said folder blades to fold the fabric blanks, means for moving said folder blades intermittently past said cooperating means, and stop mechanism for accurately positioning said revoluble support when the folder blades are opposite said cooperating means.

20. A machine for folding fabric blanks comprising a support for the fabric blank, a die or templet arranged above said support, a folder blade adapted to fold the edge of the fabric blank over said die or templet, a lever for actuating said folder blade, and cam mechanism arranged beneath said folder blade for shifting said lever.

21. A machine for folding fabric blanks comprising a support for the fabric blank, a die or templet arranged above said support, a folder blade adapted to fold the edge of the fabric blank over said die or templet, means for imparting a back and forth movement to said folder blade, and means for lifting said folder blade as it is moved above the edge of said die or templet.

22. A machine for folding fabric blanks comprising a support for the fabric blanks, a die or templet arranged above said support, a folder blade adapted to fold the edge of the fabric blank over said die or templet, a lever for actuating said folder blade, means for shifting said lever, and spring mechanism for holding said folder blade at the extremes of its movement.

23. A machine for folding fabric blanks comprising a support for the fabric blanks, a die or templet arranged above said support, a folder blade adapted to fold the edge of the fabric blank over said die or templet, a movable carrier for said folder blade, a link pivotally connected to said carrier, a lever connected at its upper end to said carrier for moving the same back and forth, and means for engaging the opposite end of said lever to move the same in opposite directions.

24. A machine for folding fabric blanks comprising a movable support for the fabric blanks, a folder blade adapted to fold the edge of the fabric blank, a carrier movable with said blank support for supporting said folder blade, a lever pivotally mounted below said carrier and having its upper end connected thereto, and means for engaging the lower end of said lever to shift the same in opposite directions.

25. A machine for folding fabric blanks comprising a movable support for the fabric blanks, a plurality of folder blades arranged adjacent the edges of said support and movable therewith, an actuating lever for each of said folder blades, and a plurality of cams for shifting said actuating levers.

26. A machine for folding fabric blanks comprising a movable support for the fabric blanks, a plurality of folder blades arranged adjacent the edges of said support and movable therewith, an actuating lever for each of said folder blades, and a plurality of cams for shifting said actuating levers, said cams being arranged to shift said levers in succession.

27. A machine for folding fabric blanks comprising a support for the fabric blanks, a plurality of folder blades arranged adjacent the edge of said support, carriers whereon said folder blades are mounted, pivoted levers connected to said carriers for actuating said folder blades, said levers depending below said carriers, a plurality of cam fingers arranged below said levers, and means for shifting said cam fingers to cause them to actuate said levers.

28. A machine for folding fabric blanks comprising a plurality of supports for the fabric blanks, a revoluble table or carrier for said supports, folder blades arranged adjacent said supports, levers depending beneath said table for actuating said folder blades, a plurality of cam fingers arranged below said levers, and a vertically movable support for actuating said cam fingers to cause them to shift said levers.

29. A machine for folding fabric blanks comprising a plurality of supports for the fabric blanks, a revoluble table or carrier for said supports, folder blades arranged adjacent said supports, depending levers for actuating said folder blades, dies or templets arranged above said folder blades for cooperating therewith to fold the fabric blanks, means for shifting said dies or templets, a presser device for pressing the folded fabric blanks arranged above the path of travel of said supports, and a discharge device arranged above the path of travel of said supports for removing the fabric blanks from the machine.

30. A machine for folding fabric blanks comprising a support for the fabric blanks, a folder blade arranged adjacent said support, means for actuating said folder blade, a die or templet for cooperating with said folder blade in folding the edge of the fabric blank, a vertically arranged support for swinging said die or templet from beneath the folded edge of the fabric blank, and cam mechanism for actuating said support.

31. A machine for folding fabric blanks comprising a support for the fabric blanks, means for moving said support, a folder blade arranged adjacent said support and movable therewith, means for actuating said folder blade, a relatively stationary die or templet for cooperating with said folder blade in folding the edge of the fabric blank, said die or templet being arranged above the path of movement of said support, and means for swinging said die or templet transversely of the path of movement of said support to free said die or templet from the folded edge of the blank.

32. A machine for folding fabric blanks comprising a series of supports for the blanks, folder blades associated and movable with said supports, said supports and folder blades being revoluble in a horizontal plane, a relatively stationary die or templet arranged above the path of travel of said supports, and means for swinging said die or templet transversely of the path of movement of said supports to free said die or templet from the folded edges of the blanks.

33. In a machine for folding fabric blanks, the combination of a support for the blanks, means for moving said support, mechanism for folding the edges of the blanks, a pressing device arranged adjacent the path of movement of said support but not movable with said support, and means for moving said pressing device to cause it to press the folded blanks as said blanks are successively presented thereto.

34. In a machine for folding fabric blanks, the combination of a support for the blanks, means for moving said support, mechanism for folding the edges of the blanks, a pressing device arranged adjacent the path of movement of said support but not movable with said support, means for moving said support towards the pressing device, and means for moving the pressing device to cause it to press the folded edges of the blank on said support.

35. In a machine for folding fabric blanks, the combination of a support for the blanks, means for moving said support, means for folding the blanks, and means for pressing the blanks comprising a plate, a rod passing loosely through said plate and means for forcing said plate against the folded blank.

36. In a machine for folding fabric blanks, the combination of a support for the blanks, means for moving said support, mechanism for folding the edges of the blanks, a pressing device arranged adjacent the path of movement of said support but not movable with said support, and cam mechanism for moving said pressing device to cause it to press the folded edges of the blanks.

37. In a machine for folding fabric blanks, the combination of a plurality of supports for the blanks, means for revolving said supports in horizontal plane, means for folding the blanks, a pressing device arranged above the path of travel of said supports, means for lifting said supports towards the pressing device, and means for forcing downwardly the pressing device to press the folded blanks.

38. In a machine for folding fabric blanks, the combination of a plurality of supports for the blanks, means for successively advancing the blank supports by a step-by-step motion, a plurality of folding devices, a discharge device for removing the blanks from the supports, and means for intermittently actuating said discharge device.

39. In a machine for folding fabric blanks, the combination of a plurality of supports for the blanks, means for successively advancing the blank supports by a step-by-step motion, a plurality of folding devices, a discharge device for removing the blanks from the supports comprising a plate or carrier provided with pins, means for projecting said pins into the fabric blanks, means for removing said pin plate or carrier and the fabric blanks from the support, and means for withdrawing the pins from the blanks.

40. In a machine for folding fabric blanks, the combination with a series of supports for the fabric blanks, means for imparting a step-by-step movement to said supports and with devices for folding the edges of the fabric blanks, of a discharge device arranged above the path of travel of said supports comprising a plate or carrier provided with pins, means for bringing the supports and the discharge device together, means for causing the pins to project into the blanks, means for withdrawing the discharge device and blanks from the supports, and means for releasing the blanks from the discharge device.

41. In a machine for folding fabric blanks, the combination of a plurality of supports for the blanks, means for successively advancing the blank supports, a plurality of folding devices, a discharge device arranged above the path of travel of said supports, a vertically movable support for said discharge device, cam mechanism for lifting said vertically movable support, and means for swinging said discharge device outwardly as it is lifted.

42. In a machine for folding fabric blanks, the combination of a plurality of supports for the blanks, means for successively advancing the blank supports, a plurality of folding devices, a discharge device arranged above the path of travel of said supports, a vertically movable support for said discharge device, cams arranged beneath said discharge device, a reciprocating frame located beneath said cams and provided with means for engaging the cams, means for actuating said reciprocating frame to lift the support for the discharge device, and means for swinging said discharge device outwardly as it is lifted.

43. In a machine for folding fabric blanks, the combination of a plurality of supports for the blanks, a vertically movable shaft whereby said supports are carried, folding mechanism for folding the fabric blanks comprising folder blades associated with said supports and dies or templates arranged above said supports, means for imparting a step-by-step rotation to said shaft and the blank supports carried thereby, cam mechanism for lifting said vertical shaft to bring the supports and folder blades into cooperative relation to the dies or templets, cam fingers arranged beneath said supports, means whereby said cam fingers may actuate said folder blades, a vertically movable frame for said cam fingers, cam mechanism for actuating said vertically movable frame, and means for swinging said dies or templets transversely to the path of travel of said supports.

44. In a folding machine for fabric blanks, the combination of a plurality of supports for said fabric blanks, means for revolving said supports in a horizontal plane, and means for folding the fabric blanks on said supports including a forming element, a folding element, and means for actuating said elements in timed relation.

45. In a folding machine for fabric blanks, the combination of a plurality of supports for said fabric blanks, means for revolving said supports in a horizontal plane, and means for folding the fabric blanks on said supports including a forming element, a folding element, and means for moving said supports and said elements in timed relation.

46. In a folding machine for fabric blanks, the combination of a plurality of supports for said fabric blanks, means for revolving said supports about a common axis, folding mechanism grouped about each of said supports and movable therewith, and means disposed adjacent to the path of movement of said supports for progressively actuating the folding elements of each of said mechanisms.

47. In a folding machine for fabric blanks, the combination of a revoluble table, means for rotating said table by an intermittent movement, blank supports on said table disposed about the axis thereof at regular angular intervals, folding mechanism on said table about each of said supports, and means for effecting a progressive actuation of the folding elements of said mechanisms at successive periods of rest of said table.

48. In a folding machine, a blank support, a forming member disposed opposite said support, and a folding member adapted to turn the edge of the blank over said forming member, said members being brought into operative relation by a relative swinging movement.

49. In a folding machine, a blank support, a forming member above said support, a folding member adapted to turn the edge of the blank over said forming member, and means for moving said members into operative relation by a swinging movement at an angle to the operating faces thereof.

ALEXANDER D. ELLIOTT.